(12) United States Patent
Zheng et al.

(10) Patent No.: US 12,710,754 B2
(45) Date of Patent: Aug. 18, 2026

(54) CONTROLLING FOOT LANDING POINTS AND STEP ORDER OF LEGGED ROBOT BASED ON FOOT CONTACT FORCE

(71) Applicant: Tencent Technology (Shenzhen) Company Limited, Shenzhen (CN)

(72) Inventors: Yu Zheng, Shenzhen (CN); Xinyang Jiang, Shenzhen (CN); Wanchao Chi, Shenzhen (CN); Yonggen Ling, Shenzhen (CN); Shenghao Zhang, Shenzhen (CN); Zhengyou Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 739 days.

(21) Appl. No.: 17/987,355

(22) Filed: Nov. 15, 2022

(65) Prior Publication Data

US 2023/0076589 A1 Mar. 9, 2023

Related U.S. Application Data

(63) Continuation of application No. PCT/CN2021/123261, filed on Oct. 12, 2021.

(30) Foreign Application Priority Data

Oct. 26, 2020 (CN) ......................... 202011154803.4

(51) Int. Cl.
*G05D 1/00* (2024.01)
*B62D 57/032* (2006.01)

(52) U.S. Cl.
CPC .......... *G05D 1/021* (2013.01); *B62D 57/032* (2013.01)

(58) Field of Classification Search
CPC .... G05D 1/021; G05D 1/0246; G05D 1/0212; B62D 57/032; B25J 9/1602; B25J 9/1664; B25J 9/1679
See application file for complete search history.

(56) References Cited

U.S. PATENT DOCUMENTS

| | | | |
|---|---|---|---|
| 6,289,265 B1 * | 9/2001 | Takenaka | B25J 5/00 318/568.22 |
| 9,975,245 B1 * | 5/2018 | Whitman | B62D 57/032 |
| 2005/0051368 A1 * | 3/2005 | Takenaka | B62D 57/032 180/8.6 |

FOREIGN PATENT DOCUMENTS

| | | |
|---|---|---|
| CN | 103092196 A | 5/2013 |
| CN | 104570732 A | 4/2015 |

(Continued)

OTHER PUBLICATIONS

Physics Stack Exchange, What is the difference between center of mass and center of gravity? 2011, https://physics.stackexchange.com/questions/50107/what-is-the-difference-between-center-of-mass-and-center-of-gravity, pp. 1-2 (Year: 2011).*

(Continued)

*Primary Examiner* — Aniss Chad
*Assistant Examiner* — Chase L Cooley
(74) *Attorney, Agent, or Firm* — ARENTFOX SCHIFF LLP

(57) ABSTRACT

A method for controlling motion of a legged robot includes determining one or more candidate landing points for each foot of the robot. The method further includes determining a first correlation between a center of mass position change parameter, candidate landing points, and foot contact force. The method further includes determining, under a constraint condition set and based on the first correlation, a target center of mass position change parameter, a target step order, and a target landing point for each foot selected among the (Continued)

one or more candidate landing points for the respective foot, the constraint condition set constraining a step order. The method further includes controlling, according to the target center of mass position change parameter, the target step order, and the target landing point for each foot, motion of the legged robot in the preset period.

20 Claims, 6 Drawing Sheets

(56) References Cited

FOREIGN PATENT DOCUMENTS

| | | | |
|---|---|---|---|
| CN | 105388755 | A | 3/2016 |
| CN | 107065867 | A | 8/2017 |
| CN | 108772836 | A | 11/2018 |
| CN | 108931988 | A | 12/2018 |
| CN | 108983804 | A | 12/2018 |
| CN | 109240291 | A | 1/2019 |
| CN | 110764415 | A | 2/2019 |
| CN | 111506094 | A | 8/2020 |
| CN | 112051797 | A | 12/2020 |
| CN | 112114589 | A | 12/2020 |
| JP | 2560264 | B2 | 12/1996 |

OTHER PUBLICATIONS

Wieber, PB. (2006). Holonomy and Nonholonomy in the Dynamics of Articulated Motion. In: Diehl, M., Mombaur, K. (eds) Fast Motions in Biomechanics and Robotics. Lecture Notes in Control and Information Sciences, vol. 340. Springer, Berlin, Heidelberg. pp 411-425.

International Search Report and Written Opinion in PCT/CN2021/123261, mailed on Jan. 7, 2022, 14 pages.

* cited by examiner

Right hind leg
Left hind leg
Right front leg
Left front leg
1 2 3 4 5 6 7 8 9 10 11 12
A B C D

CONTROLLING FOOT LANDING POINTS AND STEP ORDER OF LEGGED ROBOT BASED ON FOOT CONTACT FORCE

RELATED APPLICATIONS

This application is a continuation of International Application No. PCT/CN2021/123261, entitled "LEGGED ROBOT MOTION CONTROL METHOD AND APPARATUS, DEVICE, MEDIUM, AND PROGRAM," filed on Oct. 12, 2021, which claims priority to Chinese Patent Application No. 202011154803.4, entitled "METHOD AND APPARATUS FOR CONTROLLING MOTION OF LEGGED ROBOT, DEVICE, MEDIUM, AND PROGRAM" filed on Oct. 26, 2020. The entire disclosures of the prior applications are hereby incorporated by reference in their entirety.

FIELD OF THE TECHNOLOGY

This application relates to the field of robot technologies, including a method and an apparatus for controlling motion of a legged robot, a device, a medium, and a program.

BACKGROUND OF THE DISCLOSURE

In the field of robot control, a center of mass motion trajectory of a legged robot is often determined, and then a motion control parameter of the legged robot is determined according to the center of mass motion trajectory. During controlling motion of the legged robot, how to determine the motion control parameter based on the environment of the legged robot is an urgent problem to be resolved.

SUMMARY

Embodiments of this disclosure provide a method and an apparatus for controlling motion of a legged robot, a device, a medium, and a program to improve the adaptability of the legged robot to the operation and environment.

In an embodiment, a method for controlling motion of a legged robot includes determining, according to positional state data of the legged robot at a start time point in a preset period, one or more candidate landing points for each foot of plural feet of the robot on a contact surface in the preset period. The method further includes determining, according to the positional state data at the start time point and the one or more candidate landing points of each foot, a first correlation between a center of mass position change parameter, candidate landing points, and foot contact force. The method further includes determining, under a constraint condition set and based on the first correlation, a target center of mass position change parameter, a target step order, and a target landing point for each foot selected among the one or more candidate landing points for the respective foot, the constraint condition set constraining a step order. The method further includes controlling, according to the target center of mass position change parameter, the target step order, and the target landing point for each foot, motion of the legged robot in the preset period.

In an embodiment, an apparatus for controlling motion of a legged robot includes processing circuitry configured to determine, according to positional state data of the legged robot at a start time point in a preset period, one or more candidate landing points for each foot of plural feet of the robot on a contact surface in the preset period. The processing circuitry is further configured to determine, according to the positional state data at the start time point and the one or more candidate landing points of each foot, a first correlation between a center of mass position change parameter, candidate landing points, and foot contact force. The processing circuitry is further configured to determine, under a constraint condition set and based on the first correlation, a target center of mass position change parameter, a target step order, and a target landing point for each foot selected among the one or more candidate landing points for the respective foot, the constraint condition set constraining a step order. The processing circuitry is further configured to control, according to the target center of mass position change parameter, the target step order, and the target landing point for each foot, motion of the legged robot in the preset period.

In an embodiment, a non-transitory computer-readable storage medium stores computer-readable instructions which, when executed by a computer device, cause the computer device to perform a method for controlling motion of a legged robot. The method includes determining, according to positional state data of the legged robot at a start time point in a preset period, one or more candidate landing points for each foot of plural feet of the robot on a contact surface in the preset period. The method further includes determining, according to the positional state data at the start time point and the one or more candidate landing points of each foot, a first correlation between a center of mass position change parameter, candidate landing points, and foot contact force. The method further includes determining, under a constraint condition set and based on the first correlation, a target center of mass position change parameter, a target step order, and a target landing point for each foot selected among the one or more candidate landing points for the respective foot, the constraint condition set constraining a step order. The method further includes controlling, according to the target center of mass position change parameter, the target step order, and the target landing point for each foot, motion of the legged robot in the preset period.

DESCRIPTION OF EMBODIMENTS

Figure 1:
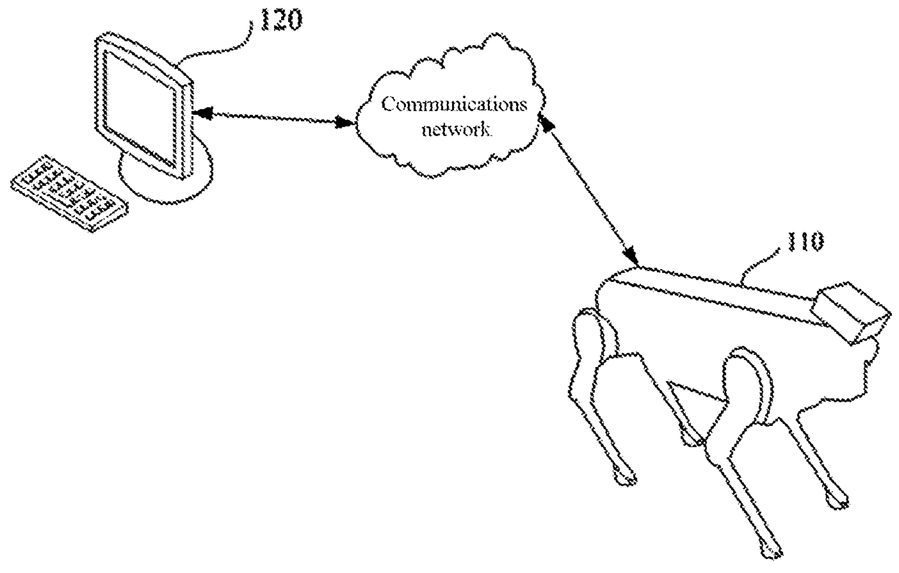
FIG. 1 is an exemplary diagram of an application scenario of a method for controlling motion of a legged robot according to an embodiment of this disclosure.

To make the technical solution according to an embodiment of this disclosure better understood, the following describes in detail with reference to the accompanying drawings of the specification and specific implementations.

In order to facilitate a person skilled in the art to better understand the technical solution of this disclosure, the terms involved in this disclosure are introduced below.

Robot: It includes various machines (such as robot dogs and robot cats) that simulate human behaviors or simulate other living creatures in thought. In a broad sense, some computer programs are also referred to as robots. In the contemporary industry, a robot refers to an artificial robot that can automatically execute a task, and is used for replacing or assisting a human to work, and may be an electromechanical apparatus, or is controlled by a computer program or an electronic circuit.

Legged robot: It generally refers to a robot with a foot end (foot). The legged robot may be configured with one or more legs, and each leg may be configured with one or more joints, usually one leg corresponds to three joints, and each leg corresponds to a foot end. For example, a two-legged robot, a four-legged robot, or a six-legged robot. For example, the four-legged robot is a robot dog. Since the legged robot may include a plurality of foot ends, and the foot ends that land at different moments may be different, the respective foot ends of the legged robot may be represented as a first foot end, a second foot end, . . . , an i-th foot end, and the like, for ease of distinction. When a foot end lands, correspondingly, the robot steps a leg corresponding to the foot end.

Preset period: It refers to a time length of each motion of the robot. A length of the preset period may be arbitrary and may be set according to programming needs. The preset period includes a plurality of moments, and in this disclosure, a moment selected from the plurality of moments in the preset period is referred to as a sampling moment (or sampling time point). During a motion process of the legged robot, the legged robot is programmed from A to B, a total time required from point A to point B may be divided into a plurality of preset periods, and the process of controlling the legged robot from A to B is specifically divided into controlling the legged robot to complete motion corresponding to each preset period in sequence.

Start moment: It refers to a moment at which the robot starts to move in the preset period. The start moment may, for example, be counted from 0. A position of the robot at the start moment may be referred to as a start position.

Termination moment: It is also referred to as an end moment, which refers to a moment at which the motion ends in the preset period, that is, a moment at which the robot stops motion along the preset period. A position of the robot at the termination moment may be referred to as a termination position or an end position.

State data: It includes center of mass state data of the robot, and further includes a pose, a landing point, a foot end position, and the like of the robot. Since the state data is related to a current state of the robot, state data of the robot at different moments is different.

Center of mass state data: It is data for describing a center of mass state change of the robot, specifically including one or more of a center of mass position, center of mass velocity, or center of mass acceleration of the robot. The center of mass position is a central position of a mass of the robot, and is used for describing a position of the robot. The center of mass position changes when the robot is in different motion states. The center of mass velocity may be obtained by taking a first derivative of the center of mass position relative to time, and the center of mass acceleration may be obtained by taking a second derivative of the center of mass position relative to time. For ease of description, a center of mass position at the start moment may be referred to as a start center of mass position, a center of mass velocity at the start moment may be referred to as a start center of mass velocity, and a center of mass acceleration at the start moment may be referred to as a start center of mass acceleration. Similarly, a center of mass position at the end moment may be referred to as an end center of mass position, a center of mass velocity at the end moment may be referred to as an end center of mass velocity, and a center of mass acceleration at the end moment may be referred to as an end center of mass acceleration.

Given pose: During the motion process, the robot has continuously changing poses. Before controlling the robot to move, a pose of the robot at the start moment and a pose of the robot at the end moment may be set, and the set pose is the given pose. The given pose may be represented by a matrix, a vector, a plurality of coordinate values, or the like.

Desired pose: It refers to a pose of the robot at each moment determined according to a landing point of the robot, which can be understood as a pose that the robot is expected to achieve at a specific moment.

Landing point: It refers to a position where the foot end of the robot is in contact with a contact force, which is used for referring to a landing point of the robot in general. The landing point may be a start landing point or a candidate landing point. When the candidate landing point is selected as the landing point of the foot end, the candidate landing point may also be regarded as a target landing point. The start landing point refers to a landing point of the legged robot at the start moment.

Candidate landing point: It refers to a determined position where the foot end may be in contact with a contact surface when the foot end of the robot is in contact with the contact surface. Usually, one or more candidate landing points are determined for each landing foot end of the robot according to a motion environment of the robot. For example, candidate landing points of a landing i-th leg include A, B, and C.

Target landing point: It refers to the selected candidate landing point that are eventually determined from the candidate landing points. In an embodiment of this disclosure, the target landing point and the step order may be represented based on a binary variable $\beta_{ijk}$. After determining a value of the $\beta_{ijk}$, the selected candidate landing point can be naturally determined correspondingly, a value of the target landing point can be obtained correspondingly, and according to the selected candidate landing point of each step, a leg of the each step can be obtained correspondingly, that is, the step order can be obtained.

Center of mass position change parameter: The center of mass position change parameter is used for describing a parameter showing a change of the center of mass position over time. The center of mass position change parameter is represented in the form of a matrix, in the form of a vector, or the like. The center of mass position change parameter and a time interval can jointly represent a center of mass position at a particular moment, and the time interval refers to a time difference between the particular moment and the start moment.

Contact surface: It is a surface where the foot end of the robot is in contact with an environment. The contact surface is, for example, the ground, or another support in contact with the foot end. The corresponding contact surface of the legged robot may be different due to other cases, such as an uneven road surface. In an embodiment of this disclosure, description is made using that the foot end is in contact with the contact surface as an example, but the method according to this embodiment of this disclosure is still applicable to a case that other portions of the legged robot are in contact with the contact surface.

Center of mass motion trajectory: It is also referred to as a center of mass position motion trajectory, or a center of mass trajectory, which is used for describing center of mass positions of the robot at different moments. The center of mass motion trajectory is formed by the center of mass positions of the robot at different moments.

A quantity of contact points: It refers to a quantity of the foot ends of the robot being in contact with the contact surface. Certainly, the quantities of the foot ends of the robot being in contact with the contact surface at different moments are not the same, and thus a quantity of contact points may change over time.

Step timing: The step timing indicates when the robot steps which leg, specifically including a step time and a step order. The step time is used for describing when the robot steps a leg during the preset period. The step order refers to an order in which the robot steps a leg during the preset period, for example, the robot first steps a left hind leg and then steps a right hind leg.

Foot end contact force: It refers to a contact force size between the foot end of the robot and the contact surface. When the foot end of the robot is not in contact with the contact surface, there is no foot end contact force between the foot end and the contact surface, or it may be understood that the foot end contact force is 0. A foot end contact force may also be called a foot contact force.

Constraint condition set: It is used for constraining one or more of four variables of the center of mass position change parameter, the step order, the landing point, or the foot end contact force. The constraint condition set includes one or more constraint conditions. The constraint condition set in this embodiment of this disclosure includes a constraint condition used for constraining the step order, a spatial landing constraint condition, a friction force constraint condition, and a contact force constraint condition. The constraint conditions are respectively described below:

(1) The constraint condition used for constraining the step order includes at least one of the following:

- a first constraint condition that constrains the legged robot to select at most one candidate landing point per leg at each step;
- a second constraint condition that constrains the legged robot not to withdraw after each leg step; and
- a third constraint condition that constrains the legged robot to have a quantity of steps reaching a preset quantity of steps in the preset period, selection of one candidate landing point corresponding to one step.

(2) The spatial landing constraint condition: It is used for constraining the legged robot to have the foot end locate in a workspace corresponding to the foot end after each step. The spatial landing constraint condition can be used for constraining the center of mass position change parameter, the step order, and the landing point of the robot.

(3) The friction force constraint condition: It is used for constraining the foot end contact force at each sampling moment to be located in a friction cone to avoid slippage between the legged robot and the contact surface, the friction cone being determined according to a normal vector of the legged robot at the candidate landing point and a friction coefficient between the landing foot end and the contact surface.

(4) The foot end contact force constraint condition: It is used for constraining a contact force of the foot end contact force at each sampling moment in a normal direction to be less than or equal to an upper limit of the contact force, to avoid an excessive acting force between the legged robot and the contact surface.

Target motion control parameter: It refers to a parameter required for controlling the motion of the legged robot. The target motion control parameter specifically includes a desired joint rotation angle of the legged robot at each sampling moment and a joint torque at each sampling moment.

Pose change angle parameter: It includes a pose change angle, a pose change angle velocity, and a pose change angle acceleration of the robot. The pose change angle may refer to a change angle of the robot from one pose to another pose. For example, the robot moves from a point A to a point B in a first pose, and the robot is also in the first pose at the point B, then the pose change angle of the robot is 0. The pose change angle velocity is obtained by taking a first derivative of the pose change angle relative to time, and the pose change angle acceleration is obtained by taking a second derivative of the pose change angle relative to time.

In addition, in the embodiments of this disclosure, "a plurality of" refers to two or more, and "at least one" refers to one or more.

In order to improve the adaptability of the generated motion control parameter to the environment, an embodiment of this disclosure provides a method for controlling motion of a legged robot. The design idea of the method for controlling motion of a legged robot involved in this embodiment of this disclosure is introduced below.

In this embodiment of this disclosure, candidate landing points and a quantity of steps are set for each leg that needs to be stepped in a preset period. A first correlation between a center of mass position change parameter, a candidate landing point, and a foot end contact force is determined according to candidate landing points of each foot end and a quantity of steps. Therefore, a target center of mass position change parameter, a target landing point, and a target step order of the legged robot are determined in combination with the first correlation and a constraint condition set. Further, a center of mass motion trajectory of the legged robot is determined according to the target center of mass position change parameter and the step order, and a target motion control parameter is determined according to the center of mass motion trajectory and the target landing point. The legged robot is controlled to move in the preset period using the target motion control parameter.

In this embodiment of this disclosure, in determining the target motion control parameter of the legged robot, the center of mass position change parameter, the step order, the landing point, and other variables of the legged robot are all determined according to cases, so that the motion control parameter determined based on these variables can be more consistent with a motion environment of the legged robot, thereby improving the adaptability between the determined motion control parameter and the environment, and also improving the adaptability of the motion of the legged robot to the environment. In addition, in this embodiment of this disclosure, it is possible to automatically generate a center of mass position and the step order of the legged robot, and to automatically select the landing point and the step order of the legged robot, which improves the intelligent degree of the legged robot.

Further, in this embodiment of this disclosure, a mixed integer quadratic programming may be constructed according to the first correlation, the constraint condition set, and a cost function, and the target center of mass position change parameter, the target landing point, and the target step order may be solved by a method for solving the mixed integer quadratic programming. If there is a solution of the mixed integer quadratic programming problem, it is inevitable that a global optimal solution can be solved. Therefore, by converting the solving of the target center of mass position change parameter, the target landing point, and the target step order into the mixed integer quadratic programming problem, the optimal target center of mass position change parameter, the target landing point, and the target step order can be solved.

Based on the above design ideas, an application scenario of the method for controlling motion of a legged robot according to an embodiment of this disclosure is introduced below.

The method for controlling motion of a legged robot is adapted to control various gaits of various types of legged robots in various environments. Various types of legged robots include a two-legged robot, a four-legged robot, and the like. Various environments include flat ground, uneven ground, slopes, stairs, and the like. Various gaits include bipedal walking, quadrupedal walking, quadrupedal trotting, random gaits, and the like.

Referring to FIG. 1, which is an application scenario diagram of the method for controlling motion of a legged robot, or may be understood as an architecture diagram of a system for controlling motion of a legged robot. The architecture diagram includes a legged robot 110 and a control device 120. An example of the interaction between the control device 120 and the legged robot 110 is described below.

In a possible case, the control device 120 and the legged robot 110 are two relatively independent devices. In this case, the legged robot 110 performs wired or wireless communication with the control device 120. In FIG. 1, for example, the communication between the legged robot 110 and the control device 120 is implemented using a communications network.

Before controlling the legged robot 110 to move, the control device 120 may set state data and a step order of the legged robot 110 at a start moment according to an operation of a user or a task of the legged robot 110. Alternatively, the legged robot 110 may detect the state data at the start moment and upload the state data at the start moment to the control device 120. Alternatively, the control device 120 directly collects the state data of the legged robot 110 at the start moment. In some cases, it may be unnecessary to obtain a quantity of steps of the legged robot 110.

Further, the control device 120 collects an image of the environment in which the legged robot 110 is currently located, or receives an environment image reported by the legged robot 110. The control device 120 determines, according to the environment image, a possible candidate landing point for a foot end of the legged robot 110 that needs to land in a preset period. Certainly, there are many ways for the control device 120 to determine the candidate landing point, which are described in detail below.

The control device 120 determines a motion control parameter of the legged robot 110 according to the state data, the step order, and the candidate landing point, and then controls the legged robot 110 to perform corresponding motion. The content of determining the motion control parameter is described below.

The control device 120 may be implemented by a server or a terminal, and the server includes, but is not limited to: an independent physical server, a server cluster or a distributed system formed by a plurality of physical servers, or a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal is, for example, a mobile phone, a personal computer, a smart television, or a portable tablet computer.

In another possible case, the control device 120 is part of the legged robot 110. In this case, the control device 120 may be arranged in a body of the legged robot 110, for example, the control device 120 is an internal processor in the legged robot 110, or the like.

Before the control device 120 controls the legged robot 110 to move, the control device 120 may receive a motion instruction from a host computer or operate according to an input by the user to obtain the motion instruction. The motion instruction may instruct the legged robot 110 to perform a specific task, or instruct a start moment and an end moment of the legged robot 110 in the preset period. The host computer may be any device that is wirelessly connected to or wired to the control device 120, such as a terminal or a server.

Similarly, the control device 120 collects the state data of the legged robot 110. The control device 120 may determine a possible candidate landing point for each landing foot end of the legged robot 110 according to an image of the environment in which the legged robot 110 is currently located. The control device 120 determines a target motion control parameter of the legged robot according to the state data, the quantity of steps, and the candidate landing point, to control the legged robot 110 to move. The content of determining the target motion control parameter is described below.

Figure 2:
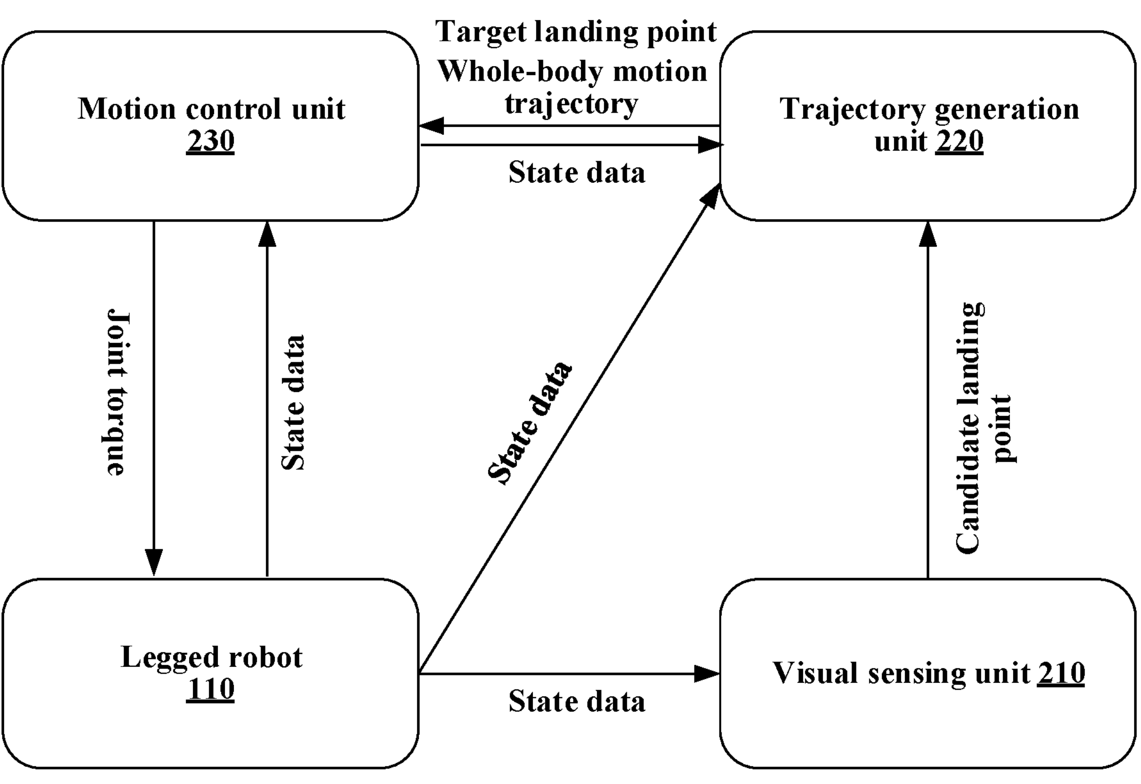
FIG. 2 is an architectural diagram of a system for controlling motion of a legged robot according to an embodiment of this disclosure.

For a clearer introduction of a structure of the control device 120, exemplary introduction is made below with reference to a system for controlling motion of a legged robot shown in FIG. 2. In FIG. 2, for example, the control device 120 includes a visual sensing unit 210, a trajectory generation unit 220, and a motion control unit 230.

The visual sensing unit 210 may be arranged on the legged robot 110, for example, the visual sensing unit 210 is mounted on a head portion of the legged robot 110. The visual sensing unit 210 includes, for example, one or more of a camera and an infrared camera. For example, the camera is an RGBD camera. The visual sensing unit further includes a function for implementing simultaneous localization and mapping.

The visual sensing unit 210 collects the state data of the robot. The state data includes the state data at the start moment of the legged robot 110.

In addition, the visual sensing unit 210 may further collect an image of the environment in which the legged robot 110 is located, and obtain a possible candidate landing point for each landing of the legged robot 110. After obtaining the state data and the environment image, the visual sensing unit 210 may send the state data and the environment image to the trajectory generation unit 220.

Alternatively, the trajectory generation unit 220 may obtain the state data of the legged robot 110 through an internal sensor and an external sensor of the legged robot 110. Alternatively, the trajectory generation unit 220 may use desired state data at an end moment in a previous preset period as state data at a start moment in a current preset period. Alternatively, the trajectory generation unit 220 obtains the state data of the legged robot 110 through a state estimator of the motion control unit 230.

The trajectory generation unit 220 receives the state data and the candidate landing point, and determines center of mass positions, target landing points, and step orders of the legged robot 110 at a plurality of moments according to the state data, the candidate landing point, and the quantity of steps. The trajectory generation unit 220 obtains a center of mass motion trajectory of the legged robot 110 according to the center of mass positions, the step orders and the like at the plurality of moments. Then, the trajectory generation unit 220 determines a whole-body motion trajectory of the legged robot 110 according to the center of mass motion trajectory and the target landing point, and sends the whole-body motion trajectory and the target landing point to the motion control unit 230.

The motion control unit 230 may determine a joint torque of each joint of the legged robot 110 according to the whole-body motion trajectory and the target landing point, and control each joint of the legged robot 110 to rotate according to each joint torque, so as to implement motion of the legged robot 110.

Further, the motion control unit 230 may further monitor real-time state data during movement of the legged robot 110, and control the motion of the legged robot 110 according to the real-time state data to ensure stable movement of the legged robot 110.

Based on the above application scenario, a general idea of the method for controlling motion of a legged robot involved in this embodiment of this disclosure is introduced as follows:

In this embodiment of this disclosure, a first correlation between a center of mass position change parameter, a foot end contact force, and a landing point and a constraint condition set are determined according to state data, a step order, and a candidate landing point of each foot end. Then, a center of mass position change parameter, a step order, and a landing point are solved for. Further, a center of mass motion trajectory of the legged robot 110 is obtained according to the target center of mass position change parameter and the target step order, and a target motion control parameter of the legged robot 110 is determined according to the center of mass motion trajectory, the step order, and the target landing point. The target motion control parameter is used for controlling the motion of the legged robot 110.

Further, when determining the target center of mass position change parameter, the target landing point, and the target step order, the constraint condition set and the first correlation may be used for converting the problem of determining the center of mass position change parameter, the landing point, and the step order into a mixed integer quadratic programming problem. By solving the mixed integer quadratic programming problem, the target center of mass position change parameter, the target landing point, and the target step order are obtained. The first correlation, the second correlation, and the constraint condition set are pre-configured in the control device 120, or obtained by the control device 120 from other devices or network resources, or created by the control device 120. An example of how the control device 120 creates the first correlation, the second correlation, and the constraint condition set is described below:

I. Obtain a first correlation and a constraint condition used for constraining a step order.

The control device 120 may obtain a center of mass dynamics equation from a network resource or another device, where the center of mass dynamics equation represents the relationship between the legged robot and an external force received. The control device 120 expresses a center of mass position at each sampling moment in the center of mass dynamics equation by using a start center of mass position, a center of mass position change parameter, and a time interval, so as to transform the center of mass dynamics equation into the first correlation between the center of mass position change parameter, the foot end contact force, and the landing point.

After obtaining the first correlation, the control device 120 may store the first correlation in any form, such as a function form or a description statement form.

A specific example of a process in which the control device 120 creates the first correlation is described below:

1: Obtain a center of mass dynamics equation of the legged robot 110.

The center of mass dynamics equation may be expressed in various forms, such as the Newton-Euler equation, and an example of the center of mass dynamics equation is as follows:

$$\begin{bmatrix} m(\ddot{p}_G - g) \\ \dot{L} \end{bmatrix} = \sum_{i=1}^{N_c} \begin{bmatrix} I_{3\times3} \\ \widehat{\mathbf{r}_i} - \widehat{\mathbf{p}_G} \end{bmatrix} f_i, \tag{1}$$

where m is a total mass of the legged robot 110, $g \in R^3$ is a gravitational acceleration, $p_G \in R^3$ is a center of mass position of the legged robot 110, $\widehat{\mathbf{r}_i} \in R^3$ is a position of an i-th contact point in which the legged robot 110 is in contact with a contact surface, or may be referred to as a landing point, that is, a position of a foot end being in contact with the contact surface, $L \in R^3$ is a center of mass angular momentum of the legged robot 110, $\dot{L}$ represents a first derivative of the center of mass angular momentum relative to time, $f_i \in R^3$ is a foot end contact force of the i-th contact point, $N_c$ is a quantity of contact points, that is, a quantity of landing foot ends, a $\widehat{(\ )}$ operation represents an oblique diagonal array of ( ), $\ddot{p}_G$ represents a second derivative of $p_G$ relative to a time interval, I represents a unit matrix, and $R^3$ represents three coordinate values in a coordinate system.

In the embodiments of this disclosure, unless otherwise specified, each amount is a representation result in a world coordinate system. For example, each variable in formula (1) is a representation result in the world coordinate system.

The first three rows in formula (1) are obtained according to Newton's law, and the last three rows are obtained according to Euler's equation.

Further, according to the first three rows in the above formula (1), it can be seen that:

$$m(\ddot{p}_G - g) = \sum_{i=1}^{N_c} f_i. \tag{2}$$

Substitute formula (2) into formula (1) to obtain the following formula:

$$\begin{bmatrix} m(\ddot{p}_G - g) \\ m\hat{p}_G(\ddot{p}_G - g) + \dot{L} \end{bmatrix} = \sum_{i=1}^{N_c} \begin{bmatrix} I_{3\times3} \\ \hat{r}_1 \end{bmatrix} f_i = \sum_{i=1}^{N_c} G_i f_i, \tag{3}$$

-continued where $G_i\begin{bmatrix} I_{3\times 3} \\ \hat{r}_1 \end{bmatrix}$. $G_i \in R^{6\times 3}$ is a 6×3 matrix.

2: Express a center of mass position at each sampling moment in the center of mass dynamics equation as a sum of a start center of mass position and a center of mass position change amount after a time interval t to obtain a second correlation.

①: Set the center of mass position as the sum of a start center of mass position and the center of mass position change amount after the time interval t, which is specifically:

$$p_G = p^{init} + p_t, \tag{4}$$

where $p^{init}$ represents the start center of mass position, and $p_t$ represents the center of mass position change amount after the time interval t.

②: Substitute formula (4) into formula (3) to obtain the second correlation as follows:

$$Gf = m\begin{bmatrix} \ddot{p}_t \\ \widehat{\mathbf{p}^{init}}\ddot{p}_t + \hat{g}p_t \end{bmatrix} - m\begin{bmatrix} g \\ \widehat{\mathbf{p}^{init}}g \end{bmatrix} + \begin{bmatrix} 0_{3\times 3} \\ \dot{L} \end{bmatrix} + \begin{bmatrix} 0_{3\times 1} \\ m\hat{p}_t\ddot{p}_t \end{bmatrix}. \tag{5}$$

Terms in the second correlation are analyzed below:

The first term $$m\begin{bmatrix} \ddot{p}_t \\ \widehat{\mathbf{p}^{init}}\ddot{p}_t + \hat{g}p_t \end{bmatrix}$$

is in a linear relationship with $\ddot{p}_t$ and $p_t$, the second term $$m\begin{bmatrix} g \\ \widehat{\mathbf{p}^{init}}g \end{bmatrix}$$

is a constant term, the third term $$\begin{bmatrix} 0_{3\times 3} \\ \dot{L} \end{bmatrix}$$

has $\dot{L}$, and the fourth term $$\begin{bmatrix} 0_{3\times 1} \\ m\hat{p}_t\ddot{p}_t \end{bmatrix}$$

has a product of $\hat{\mathbf{p}}_t$ and $\ddot{p}_t$.

As an embodiment, in a case that a pose of the legged robot 110 changes less, $\dot{L}$ is approximately $0_{3\times 1}$, alternatively, a value of the third term $$\begin{bmatrix} 0_{3\times 3} \\ \dot{L} \end{bmatrix}$$

may be determined according to a pre-configured pose of the legged robot 110 at each sampling moment.

In a possible embodiment, the value of $\dot{L}$ may be determined according to a given pose at the start moment and a given pose at the end moment of the legged robot. A formula for determining $\dot{L}$ is described below:

A pose change amount in the preset period may be expressed as:

$$\Delta R = R_{te}R_{ts}^T \tag{6}$$

where $(\ )^T$ in this disclosure represents performing transposition processing on ( ); ΔR is the pose change amount, $R_{ts}$ is the given pose at the start moment, and $R_{te}$ is the given pose at the end moment. The pose change amount may be represented as rotating a specific pose angle θ around a specific unit axis 1:

$$\theta = \cos^{-1}\left(\frac{\Delta R_{11} + \Delta R_{22} + \Delta R_{33} - 1}{2}\right) \tag{7}$$

$$1 = \frac{1}{2\sin(\theta)}\begin{bmatrix} \Delta R_{32} - \Delta R_{23} \\ \Delta R_{13} - \Delta R_{31} \\ \Delta R_{21} - \Delta R_{12} \end{bmatrix}, \tag{8}$$

where the unit axis 1 is a rotation axis represented by a vector, $\Delta R_{11}$ represents an element in row 1 and column 1 in ΔR, $\Delta R_{22}$ represents an element in row 2 and column 2 in ΔR, $\Delta R_{23}$ represents an element in row 2 and column 3 in ΔR, $\Delta R_{32}$ represents an element in row 3 and column 2 in ΔR, $\Delta R_{21}$ represents an element in row 2 and column 1 in ΔR, $\Delta R_{12}$ represents an element in row 1 and column 2 in ΔR, $\Delta R_{33}$ represents an element in row 3 and column 3 in ΔR.

In a case of satisfying the following conditions, cubic curve interpolation is performed on a pose change angle:

$$\theta_{ts} = \theta,\ \dot{\theta}_{ts} = 0,\ \theta_{te} = 0, \text{ and } \dot{\theta}_{te} = 0,$$

where $\theta_{ts}$ represents a pose change angle at the start moment, $\theta_{te}$ represents a pose change angle at the end moment, $$\dot{\theta}_{ts}$$

represents a value of a first derivative of the pose change angle relative to time at the start moment, $$\dot{\theta}_{te}$$

represents a value of the first derivative of the pose change angle relative to time at the end moment, and thus, the given pose of the legged robot at any moment may be expressed as:

$$R_t = \left(I + \hat{l}\sin\theta_t + \hat{l}^2(1 - \cos\theta_t)\right)R_{ts}, \tag{9}$$

where I represents a unit matrix, $R_t \in R^{3\times 3}$ is a rotation matrix and represents a given pose of the legged robot 110 at a corresponding moment, and $\theta_t$ represents a corresponding pose change angle at any moment.

$$\dot{L} = I_0^s\dot{\omega}_0^s - (I_0^s\omega_0^s)\times\omega_0^s \tag{10}$$

$$I_0^s = R_t I_0 R_t^T,\ \omega_0^s = I\dot{\theta}_t,\text{ and }\dot{\omega}_0^s = I\ddot{\theta}_t,$$

where $I_0$ represents a rotation inertia of the legged robot about the center of mass in a body coordinate system.

$$I_0^s$$

represents a rotation inertia of the legged robot in a specific coordinate system, an origin of the coordinate system is the center of mass position of the legged robot 110, and a pose of the coordinate system is the same as a pose of the world coordinate system.

$$I_0^s$$

may be a fixed value, $$\omega_0^s$$

represent a representation result of ω in the world coordinate system, and ω represents an angle velocity in the body coordinate system. $\dot{\theta}_t$ represents a pose change angle velocity, and $\ddot{\theta}_t$ represents a pose change angle acceleration.

3: Express the center of mass position change amount in the fourth term $\hat{p}_t\ddot{p}_t$ in the second correlation as a vector sum of the change amount in each direction to obtain a fourth correlation:

$$\hat{p}_t\ddot{p}_t = \hat{p}_t^{xy}\ddot{p}_t^{xy} + \hat{p}_t^{xy}\ddot{p}_t^{z} + \hat{p}_t^{z}\ddot{p}_t^{xy} + \hat{p}_t^{z}\ddot{p}_t^{z}, \tag{11}$$

where $p_t=p_t^{xy}+p_t^z$, and $p_t^{xy}$ includes components of $p_t$ on x and y axes. $\ddot{p}_t^{xy}$ refers to a second derivative of a component of the center of mass position change amount $p_t$ on a plane formed by the x and y axes relative to time, that is, a component of a center of mass acceleration on the plane formed by the x and y axes; $\ddot{p}_t^z$ refers to a second derivative of a component of the center of mass position change amount $p_t$ on a z axis relative to time, that is, a component of the center of mass acceleration on the z axis; $\hat{p}_t^{xy}$ represents an oblique diagonal array of the component of the center of mass position change amount $p_t$ on the plane formed by the x and y axes, and $\hat{p}_t^z$ represents an oblique diagonal array of the component of center of mass position change amount $p_t$ on the z axis.

A z-coordinate of $p_t^{xy}$ is 0, $p_t^z$ includes a component of $p_t$ on the z axis, and an x-coordinate and a y-coordinate of $p_t^z$ are 0. A torque generated around the z axis is $m\hat{p}_t^{xy}\ddot{p}_t^{xy}$, and a torque in one direction in an x-y plane is $m\hat{p}_t^{xy}\ddot{p}_t^z+\hat{p}_t^z\ddot{p}_t^{xy}$. $\ddot{p}_t^z$ and $p_t^z$ are co-linear, therefore $\hat{p}_t^z\ddot{p}_t^z=0$.

Additionally, the motion of the legged robot 110 in a z-axis direction is generally relatively stable, and thus $\ddot{p}_t^z$, $p_t^z$, and $\hat{p}_t^{xy}\ddot{p}_t^z+\hat{p}_t^z\ddot{p}_t^{xy}$ may be ignored. In addition, absolute values of $p_t^{xy}$, $\ddot{p}_t^{xy}$, and $\hat{p}_t^{xy}\ddot{p}_t^{xy}$ are relatively small and may also be ignored. In a process of controlling the legged robot 110, a torque $m\hat{p}_t\ddot{p}_t$ related to the above formula (11) may be compensated by adjusting the foot end contact force between the foot end and the contact surface.

As an embodiment, the fifth term in the second correlation may be ignored to obtain a fifth correlation:

$$Gf \approx H_0x_t - w, \tag{12}$$

where:

$$H_0 = m\begin{bmatrix} 0_{3\times3} & I_{3\times3} \\ \hat{g} & \hat{p}^{init} \end{bmatrix},\ x_t = \begin{bmatrix} p_t \\ \ddot{p}_t \end{bmatrix},\text{ and } w = \begin{bmatrix} mg \\ m\hat{p}^{init}g - \dot{L} \end{bmatrix},$$

where $H_0$ may be calculated and obtained according to the center of mass position at the start moment, w may be a fixed value, or calculated and obtained according to a pose of the legged robot at each sampling moment, and $x_t$ includes the center of mass position change amount $p_t$ and the center of mass acceleration $\ddot{p}_t$, which is to be determined.

4: Set the center of mass position change amount to an n-order polynomial with time as an independent variable, which is specifically:

Set the center of mass position change amount to an n-order polynomial with time as an independent variable, which is specifically:

$$P_t = \begin{bmatrix} T_P & 0_{1\times(n+1)} & 0_{1\times(n+1)} \\ 0_{1\times(n+1)} & T_P & 0_{1\times(n+1)} \\ 0_{1\times(n+1)} & 0_{1\times(n+1)} & T_P \end{bmatrix}\begin{bmatrix} c_{xk} \\ c_{yk} \\ c_{zk} \end{bmatrix} = Tc, \tag{13}$$

where $T_P=[1\ t\ \ldots\ t^n]\in R^{1\times(n+1)}$, $c_*=[c_{*,0}\ c_{*,1}\ \ldots\ c_{*,n}]^T\in R^{n+1}$ is a polynomial coefficient, * represents x, y, and z, and t represents the time interval, that is, a time interval between the moment and a moment corresponding to the spatial path start point, and c refers to the center of mass position change parameter and includes all polynomial coefficients. In applications, after the center of mass position change parameter c is obtained, the center of mass position at each sampling moment of a plurality of moments may be calculated according to formula (13).

As an embodiment, a value of n is any integer greater than or equal to 2.

5: Take a second-order derivative of formula (13) relative to time, to obtain the following expression: obtain a center of mass acceleration, and obtain a sixth correlation according to the center of mass acceleration and the second correlation.

The center of mass acceleration is specifically represented as follows:

$$\ddot{P}_t = \ddot{T}c. \tag{14}$$

Substitute formula (13) and formula (14) into formula (12) to obtain the sixth correlation as follows:

$$\sum_{i=1}^{N_c} G_i f_i \approx H_0 T - w, \quad (15)$$

where $H=H_0[T^T\ \ddot{T}^T]^T$ is related to the time interval t, formula (15) represents a relationship between a polynomial coefficient c and a foot end contact force $f_i$. The relationship is obtained by transforming the center of mass dynamics equation.

6: Introduce a selected candidate landing point into formula (15). The selected candidate landing point refers to a landing point determined for the foot end from a plurality of candidate landing points, also regarded as a target landing point.

As an embodiment, it is assumed that the legged robot plans K ($0<K\leq h$) steps in a preset period and that a leg takes at most one step, and h represents a quantity of legs of the legged robot. The foot end of the legged robot 110 that needs to step usually has more than one candidate landing point, a j-th candidate landing point of an i-th leg is represented by $r_{ij}$($j=1, 2, \ldots, N_i$), and $N_i$ represents a quantity of candidate landing points of an i-th foot end.

A set of binary variables $\beta_{ijk}$ ($i=1, 2, \ldots, h$; $j=1, 2, \ldots, N_i$; $k=1, 2, \ldots, K$) is introduced to indicate whether the j-th candidate landing point of the i-th leg of the legged robot 110 at a step k is selected. In this way, after the k-th step of the legged robot 110, a landing point of the i-th leg is obtained as:

$$r_{ik} = \sum_{i=1}^{N_i} \beta_{ijk} r_{ij} + \left(1 - \sum_{i=1}^{N_i} \beta_{ijk}\right) r_{is},$$

where constraint conditions used for constraining the step order are involved, including at least one or more of a first constraint condition, a second constraint condition, and a third constraint condition, and the step order is related to the selected candidate landing point, which is described below:

The first constraint condition is used for constraining the legged robot to select at most one candidate landing point per leg when stepping, which may be specifically expressed as follows:

$$\sum_{i=1}^{N_i} \beta_{ijk} \in \{0, 1\}. \quad (16)$$

Formula (16) indicates that only one binary variable is equal to 1 in $N_i$, the rest is 0, "1" indicates that a candidate landing point is selected, "0" indicates that no candidate landing point is selected.

The second constraint condition is used for constraining each leg not to withdraw after a step, which may be specifically expressed as follows:

$$\sum_{i=1}^{N_i} \beta_{ijk} \leq \sum_{i=1}^{N_i} \beta_{ij(k+1)}. \quad (17)$$

The third constraint condition is used for indicating that a quantity of steps of the legged robot during a preset period satisfies a preset quantity of steps, which may be specifically expressed as follows:

$$\sum_{i=1}^{h} \sum_{i=1}^{N_i} \beta_{ijK} = K. \quad (18)$$

Formula (18) indicates that in a preset period, the legged robot 110 needs to complete K steps, and $\beta_{ijk}$ represents a value of $\beta_{ijk}$ corresponding to each leg after a K-th step (that is, after the last step).

As an embodiment, the constraint conditions used for constraining the step order may be obtained by the control device 120 from network resources or other devices, or created by the control device 120, and the control device 120 may store the constraint conditions used for constraining the step order in any form.

After the k-th step, if the value of $\beta_{ijk}$ is 0, it means that the landing point is not on the candidate landing point, and the candidate landing point $r_{ij}$ does not provide an acting force. When the value of $\beta_{ijk}$ is 1, it means that $r_{ij}$ is a current landing point. When the i-th foot end moves, a contact force of an initial landing point of a corresponding leg $f_{is}=0$, indicating that the initial landing point does not provide a support force. When the i-th foot end is located at the initial landing point, then $$\sum_{j=1}^{N_i} \beta_{ijk} = 0,$$

it means that the initial landing point provides a support force, that is, $f_{is}$ is not 0. Therefore, formula (15) may be rewritten as the following formula:

$$\sum_{i=1}^{h} G_{is} f_{is} + \sum_{i=1}^{h} \sum_{i=1}^{N_i} G_{ij} f_{ij} \approx Hc - w, \quad (19)$$

where $f_{is}$ and $G_{is}$ respectively represent values of the foot end contact force corresponding to the initial landing point and $G_i$.

Formula (19) is described below. Only the foot end in contact with the contact surface can generate the foot end contact force, and the legged robot is a robot with h feet. Therefore, there are at most h foot end contact forces generated by contact with the contact surface at each sampling moment, and the h foot end contact forces are non-zero. When the legged robot steps out a specific foot end, $f_{is}$ corresponding to the foot end is 0, and the contact force of the candidate landing point corresponding to the foot end is determined according to whether the leg falls and whether the landing point is selected. When the legged robot does not step out a specific foot end, the value of $f_{is}$ corresponding to the foot end is not 0.

Since values of $f_{ij}$, w, and H may be different at different moments, the above formula (19) may be further expressed as the first correlation shown below:

$$\sum_{i=1}^{h} G_{is} f_{isu} + \sum_{i=1}^{h} \sum_{j=1}^{N_i} G_{ij} f_{iju} \approx H_u c - w_u, \quad (20)$$

where u represents a corresponding moment, $f_{isu}$ represents a value of $f_{is}$ at a u-th moment, $H_u$ represents a value of H of at the u-th moment, and $w_u$ represents a value of w at the u-th moment.

The above content is an exemplary description of the process of creating the first correlation. In the above process, other dynamics equations may be used for describing the center of mass motion trajectory of the legged robot 110, thereby transforming the other dynamics equations to obtain the first correlation.

II. Obtain a constraint condition set.

The constraint condition set includes one or more constraint conditions. Each constraint condition is a value used for constraining one or more of the center of mass position change parameter, the landing point, the step order, and the foot end contact force. Each constraint condition may be in the form of an inequality. The constraint condition set includes one or more of a spatial landing constraint condition, a friction force constraint condition, and a foot end contact force constraint condition. The meaning of each constraint condition may refer to the content discussed above, and details are not described herein again.

Since a size of the foot end contact force of the legged robot 110 is different at each sampling moment, a friction force between the foot end and the contact surface is also different at each sampling moment. Therefore, a friction force constraint condition constrains a size of the friction force between the foot end being in contact with the contact surface and the contact surface at each sampling moment. Similarly, a contact force constraint condition constrains a contact force size of the foot end contact force in a normal direction at each sampling moment.

The control device 120 may obtain the constraint condition set from network resources, or other devices, or create the constraint condition set by itself. The following exemplarily describes the creation of each constraint condition by the control device 120:

(1) Obtain the spatial landing constraint condition.

1: Approximate a workspace corresponding to the foot end of the legged robot 110 as a convex polyhedron, obtain a linear inequality representation of each surface in the convex polyhedron, and combine the linear inequality of each surface to obtain a linear inequality representation of the convex polyhedron. The linear inequality of the convex polyhedron is expressed as follows:

$$S_i^T x_i \leq d_i, \tag{21}$$

where $S_i=[s_{i1}\ s_{i2}\ \ldots\ s_{il}]\in R^{3\times l}$, $d_i=[d_{i1}\ d_{i2}\ \ldots\ d_{il}]\in R^l$, $x_i$ represents the landing points of the legged robot 110 in the coordinate system, $d_{il}$ is a distance between a surface and an origin of the convex polyhedron, $s_{il}$ represents a unit normal vector corresponding to the surface of the convex polyhedron, and l represents a quantity of surfaces corresponding to the convex polyhedron. The convex polyhedron is determined according to a motion range of a joint configured at the landing foot end of the legged robot 110, and a length of the joint. The motion range includes a rotation range of the joint or a translation range of the joint.

Specifically, the control device 120 discretely determines a position reachable by the foot end of the legged robot 110 relative to the joint, according to the motion range of the joint and the length of the joint of the legged robot 110. The joint is a joint configured at the landing foot end, which may be specifically a joint directly connected to the foot end, or other joints connected to the foot end through the joint. The motion range of the joint refers to a range including the minimum and maximum angles at which the joint is able to move, for example, the motion range of the joint is 0° to 120°, which is generally known. The length of the joint is, for example, 1 meter.

Figure 3:
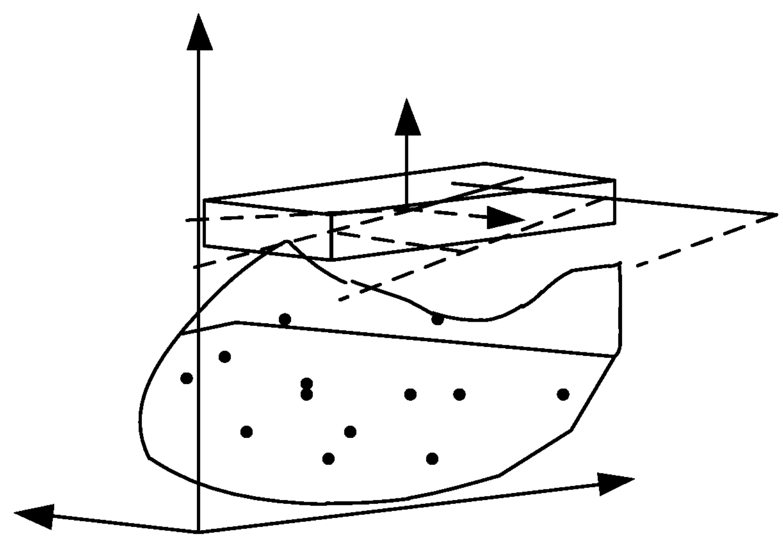
FIG. 3 is an exemplary diagram of a workspace according to an embodiment of this disclosure.

After discretely determining a plurality of positions reachable by the foot end of the legged robot 110 relative to the joint, the control device 120 fits the plurality of positions, thereby obtaining a workspace of the foot end of the legged robot 110. The workspace of the foot end of the legged robot 110 is usually a non-convex region, but the workspace may be approximated as a convex polyhedron by a fitting method. The convex polyhedron is specifically a convex polyhedron 310 as shown in FIG. 3, and each of a plurality of points shown in FIG. 3 represents a position reachable by the foot end relative to the joint.

After approximating the workspace as a convex polyhedron, the control device 120 may obtain a linear inequality representation of each surface in the convex polyhedron, and the linear inequality representation of each surface is specifically expressed as $s_{il}^T x_i \leq d_{il}$. The control device 120 combines the inequalities of the surfaces of the convex polyhedron to obtain formula (21) as described above.

In a specific implementation, the above formula (21) may be performed in a local fixed coordinate system of the joint. The local fixed coordinate system of the joint refers to a coordinate system established with a local part of the joint as a coordinate origin, that is, the coordinate origin of the local fixed coordinate system of the joint may be different from a coordinate origin of the world coordinate system. The joint may be any joint related to the landing foot end.

Figure 4A:
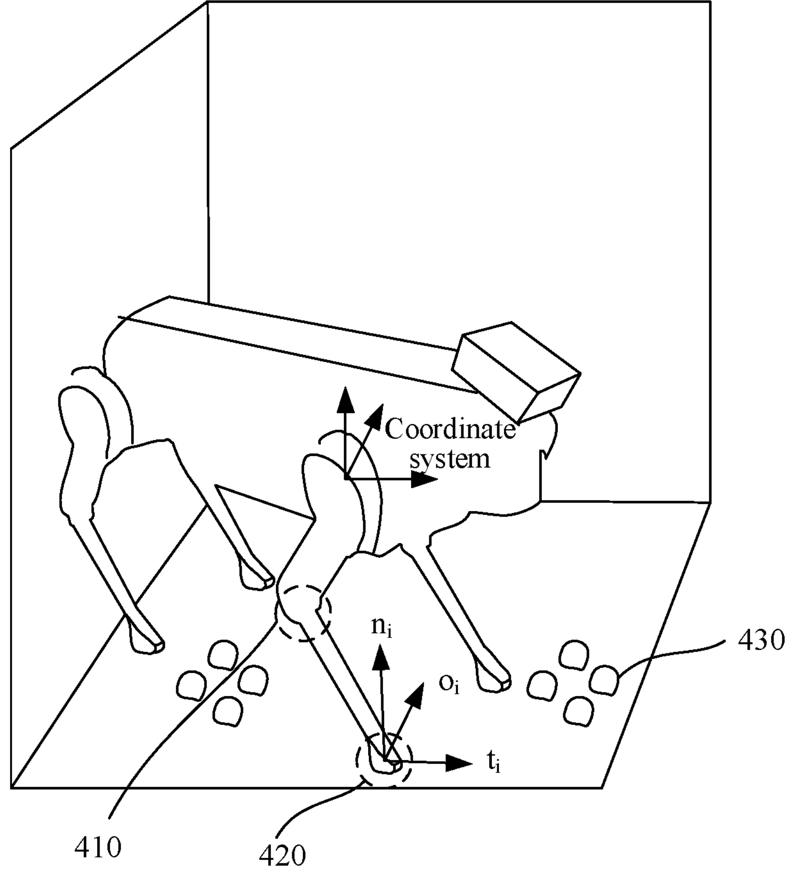
FIG. 4A is an exemplary diagram of a structure of a legged robot according to an embodiment of this disclosure.

For example, referring to FIG. 4A, which is a schematic structural diagram of a legged robot 110, the legged robot 110 includes a plurality of joints 410 and four foot ends 420, and each foot end 420 is configured with a plurality of joints. The local fixed coordinate system of the joint is as shown in FIG. 4A. In the local fixed coordinate system of the joint, each variable may be decomposed into a plurality of variables according to the local fixed coordinate system of the joint.

As discussed above, the control device 120 has determined in advance a candidate landing point 430 corresponding to a foot end that needs to land, and the control device 120 may determine whether a selected candidate landing point 430 is located in the convex polyhedron of the foot end according to the above formula (21). For example, it may be determined whether a landing point of the i-th foot end of the legged robot 110 is located in the convex polyhedron after the time interval t.

2: Convert a landing point position $r_i$ into a representation result of the local fixed coordinate system to obtain a seventh correlation.

Since the above formula (21) is a representation result in the local fixed coordinate system, it is necessary to convert the position $r_i$ of the landing foot end in the world coordinate system (also referred to as a global coordinate system) into a representation result $x_i$ in the local fixed coordinate system, and a specific conversion process is expressed as follows:

$$x_i = R_{il}^T\left(R_t^T(r_i - p_G) - p_{il}\right), \tag{22}$$

where $p_{il}\in R^3$ is a position of the joint of the i-th foot end in the legged robot 110 relative to the center of mass of the legged robot 110 in a body coordinate system, and $R_{il}\in R^3$ is a pose of the joint relative to the body coordinate system in the local fixed coordinate system. Both $p_{il}$ and $R_{il}$ are constants.

As an embodiment, in a case that the pose of the legged robot 110 changes less, $R_t$ may be a constant, or the control device 120 may determine according to a given pose of the legged robot 110 at a corresponding moment.

3: Express the center of mass position change amount in formula (4) as a time-related n-order polynomial, and substitute the polynomial into the seventh correlation, and obtain an eighth correlation according to the seventh correlation and formula (21):

The control device 120 combines formulas (4), (13), (21), and (22) to obtain the eighth correlation as follows:

$$A_i T_P + B_i r_i \leq b_i, \tag{23}$$

where:

$$A_i = -S_i^T R_{il}^T R_t^T$$

$$B_i = S_i^T R_{il}^T R_t^T$$

$$b_i = d_i + S_i^T R_{il}^T p_{il} + S_i^T R_{il}^T R_t^T p^{init}.$$

However, since it is uncertain which leg the legged robot 110 takes each time, the landing point of the legged robot after taking k steps may be expressed using the following correlation:

$$r_{ik} = \sum\nolimits_{j=1}^{N_i} \beta_{ijk} r_{ij} + \left(1 - \sum\nolimits_{j=1}^{N_i} \beta_{ijk}\right) r_{is}, \tag{24}$$

where $r_{is}$ represents an initial landing point $r_{is}$ at an initial moment (i=1, 2, 3, . . . , h) The above formula (24) indicates that when a leg of the legged robot 110 does not move, a position of the leg is at the initial landing point, and if the leg moves, the position of the leg is at the selected candidate landing point.

Substitute formula (24) into formula (23) to obtain the eighth correlation as follows:

$$A_i c + B_i\left(\sum\nolimits_{j=1}^{N_i} \beta_{ijk} r_{ij} + \left(1 - \sum\nolimits_{i=1}^{N_i} \beta_{ijk}\right) r_{is}\right) \leq b_i. \tag{25}$$

4: Introduce time into the eighth correlation to obtain the spatial landing constraint condition.

Since values of some amounts corresponding to the spatial landing constraint condition are different at different moments, time may be introduced into the eighth correlation to obtain the spatial landing constraint condition as follows:

$$A_{iu} c + B_{iu}\left(\sum\nolimits_{j=1}^{N_i} \beta_{ijk} r_{ij} + \left(1 - \sum\nolimits_{j=1}^{N_i} \beta_{ijk}\right) r_{is}\right) \leq b_{iu}, \tag{26}$$

where $A_{iu}$, $B_{iu}$, and $b_{iu}$ represent $A_i$, $B_i$, and $b_i$ corresponding to the u-th moment respectively.

An example of how the control device 120 creates the friction force constraint condition and the contact force constraint condition is described below:

(2) Obtain the friction force constraint condition.

1: Determine a friction force constraint representation corresponding to each contact force to obtain a ninth correlation.

Each foot end contact force $f_i$ (i=1, 2, . . . , h) is constrained by a friction force. The friction force constraint is to constrain the foot end contact force to be in a friction cone. The friction cone is generally a cone, but since the expression of the cone is a non-linear trigonometric function, the cone is approximated as an inscribed pyramid in this embodiment of this disclosure. The inscribed pyramid may be represented jointly by four surfaces of the pyramid. Therefore, the friction force constraint condition in this embodiment of this disclosure may be specifically approximately expressed using the following ninth correlation:

$$\begin{cases} N_{is}^T f_{is} \leq 0 \\ N_{ij}^T f_{ij} \leq 0 \end{cases}, \tag{27}$$

where a normal vector corresponding to an initial landing point $r_{is}$ may be represented as $n_{is}$, and a normal vector corresponding to a candidate landing point $r_{ij}$ may be represented as $n_{ij}$. $N_{is}=-[\mu_i n_{is}-o_i\ \mu_i n_{is}+o_i\ \mu_i n_{is}-t_{is}\ \mu_i n_{is}+t_{is}]\in R^{3\times 4}$, $n_{is}$ represents a normal vector of a landing point of an i-th leg, $o_{is}$ represents a vector of a landing point of an i-th foot end in a tangential direction, $t_{is}$ represents a vector of the landing point of the i-th foot end in another tangential direction, and $\mu_i$ represents a friction coefficient between the foot end and the contact surface. $N_{is}$ may be understood as constraints of the four surfaces of the friction cone, and the foot end contact force corresponding to the initial landing point satisfying formula (27) is located in the friction cone.

$N_{ij}=-[\mu_i n_{ij}-o_i\ \mu_i n_{ij}+o_i\ \mu_i n_{ij}-t_{ij}\ \mu_i n_{ij}+t_{ij}]\in R^{3\times 4}$, $n_{ij}$ represents a normal vector of a landing point of an i-th leg, $o_{ij}$ represents a vector of a landing point of an i-th foot end in a tangential direction, $t_{ij}$ represents a vector of the landing point of the i-th foot end in another tangential direction, and $\mu_i$ represents a friction coefficient between the foot end and the contact surface. $N_{ij}$ may be understood as constraints of the four surfaces of the friction cone, and the foot end contact force corresponding to the initial landing point satisfying formula (27) is located in the friction cone. $f_{is}$ represents the foot end contact force of the legged robot 110 corresponding to the initial landing point, and $f_{ij}$ represents the foot end contact force of the legged robot 110 corresponding to the candidate landing point.

When the legged robot 110 is at the initial landing point, a value of $f_{is}$ corresponding to the initial landing point of the legged robot 110 is not 0, and on the contrary, a value of $f_{ij}$ is 0. When the legged robot 110 moves from the initial landing point to the candidate landing point, $f_{is}$ corresponding to the initial landing point of the legged robot 110 takes a value of 0, and on the contrary, $f_{ij}$ takes a value other than 0.

Figure 4B:
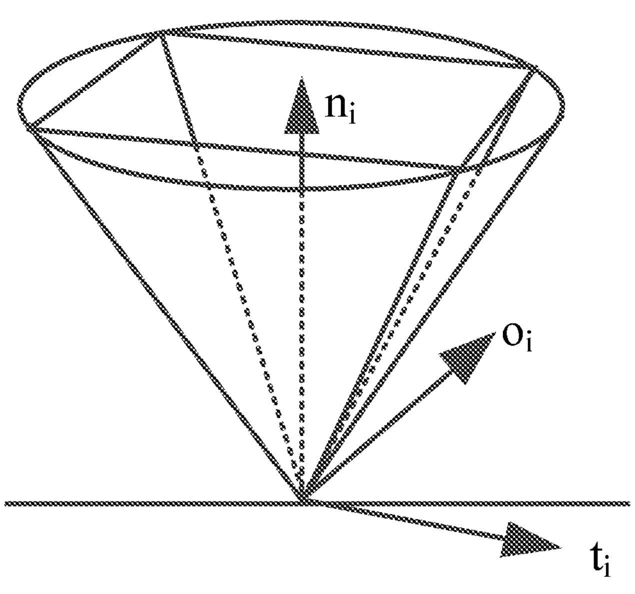
FIG. 4B is an exemplary diagram of a friction cone according to an embodiment of this disclosure.

For example, referring to FIG. 4B, which is an example diagram of a friction cone, the friction cone is a cone shown in FIG. 4B, and in this embodiment of this disclosure, the cone is replaced by the inscribed pyramid shown in FIG. 4B.

For example, further referring to FIG. 4A, a local coordinate system determined by a normal direction of the contact point is shown in FIG. 4A. The local coordinate system may refer to $o_j$, $n_i$ and $t_i$ as shown in FIG. 4A, and $o_i$, $n_i$ and $t_i$ in FIG. 4A correspond to $o_i$, $n_i$ and $t_i$ in FIG. 4B respectively.

A value of the corresponding friction coefficient may also be different when the material of the contact surface contacted by the foot end is different. At the same moment, contact surfaces contacted by different foot ends are different, and friction force coefficients between the different foot ends and the contact surfaces may also be different.

In this embodiment of this disclosure, description is made using that the cone is approximated as an inscribed pyramid as an example, but the cone may be approximated as another multi-pyramid, which is not specifically limited.

2: Introduce time into formula (27) to obtain the friction force constraint condition.

Introduce moment, so that the above formula (27) may be expressed as the following friction force constraint condition:

$$\begin{cases} N_{is}^T f_{isu} \leq 0 \\ N_{ij}^T f_{iju} \leq 0 \end{cases}, \quad (28)$$

where $f_{isu}$ represents a foot end contact force between an i-th foot end and an initial landing point at a u-th moment, and $f_{ijk}$ represents a foot end contact force of the i-th foot end and a j-th candidate landing point at a k-th moment.

(3) Obtain the contact force constraint condition:

During the motion of the legged robot 110, an excessively strong foot end contact force between the foot end and the contact surface is likely to damage a component of the legged robot 110. Therefore, the contact force constraint condition may be set to constrain the foot end contact force between the legged robot 110 and the contact surface, so as to avoid an excessively strong acting force between the legged robot 110 and the contact surface during each motion.

An example of how the control device 120 creates the contact force constraint condition is described below:

1: Set a component of the foot end contact force in the normal direction to be less than or equal to an upper limit of the contact force to obtain a tenth correlation:

$$\begin{cases} n_{is}^T f_{is} \leq f_{is}^u (1 - \beta_{ijk}) \\ n_{ij}^T f_{ij} \leq f_{ij}^u \beta_{ijk} \end{cases}, \quad (29)$$

where $$f_{is}^u$$

represents the upper limit of the contact force of the foot end contact force between the legged robot 110 and the initial landing point, and a value of the upper limit may be set according to cases, for example, reference may be made to the gravity setting of the legged robot.

$$f_{ij}^u$$

represents the upper limit of the contact force of the foot end contact force between the legged robot 110 and the candidate landing point.

2: Introduce time into the tenth correlation to obtain the contact force constraint condition:

Since the foot end contact force at each sampling moment is different, time is introduced into formula (29), which is specifically expressed as:

$$\begin{cases} n_{is}^T f_{isu} \leq f_{is}^u (1 - \beta_{ijk}) \\ n_{ij}^T f_{iju} \leq f_{ij}^u \beta_{ijk} \end{cases}. \quad (30)$$

Since the first correlation, the second correlation, and the constraint condition set include relatively few correlations, and there are many unknowns to be solved, it is not the only solution to solve the center of mass position change parameter, the landing point, and the step order based on the first correlation, the second correlation, and the constraint condition set. Therefore, when solving the center of mass position change parameter, the target landing point, and the step order described above, a target center of mass position change parameter, a target landing point, and a target step order may be determined randomly from the values satisfying the first correlation, the second correlation, and the constraint condition set.

Alternatively, in order to obtain a better center of mass position change parameter, a better target landing point, and a better step order, a cost function may further be introduced in this embodiment of this disclosure. The cost function is used for selecting an optimal center of mass position change parameter, an optimal target landing point, and an optimal step order. Further, the optimal center of mass position change parameter is determined as the target center of mass position change parameter, the optimal landing point is determined as the target landing point, and the optimal step order is determined as the target step order.

Since solving the mixed integer quadratic programming necessarily makes it possible to obtain a corresponding solution, the determining of the target center of mass position change parameter, the target landing point, and the target step order may be transformed into a mixed integer quadratic programming problem in this embodiment of this disclosure. To this end, the cost function in this embodiment of this disclosure includes at least a quadratic term of one or more variables, and the one or more variables may be any variable related to a candidate result satisfying the first correlation, the second correlation, and the constraint condition set. The quadratic term may be constructed according to the quadratic of the variable.

In a possible embodiment, the cost function includes at least one of A1 to A3 as follows:

A1: A quadratic term related to the foot end contact force in the preset period.

A2: A quadratic term of the center of mass position change amount in the preset period.

A3: A quadratic term of a difference between first center of mass state data and desired center of mass state data at the end moment in the preset period.

The first center of mass state data includes one or more of a first center of mass position, a first center of mass acceleration, and a first center of mass velocity, and the desired center of mass state data includes one or more of a desired center of mass position, a desired center of mass acceleration, and a desired center of mass velocity. Therefore, A3 may specifically include one or more of the following:

A3-1: A quadratic term of a difference between a first center of mass position and a desired center of mass position at the end moment in the preset period.

In a possible embodiment, the desired center of mass position is determined according to a landing point in the candidate result.

The desired center of mass position may be understood as a position of a suitable height above a center point of a polygon constituted by the target landing point of the legged robot in the preset period, and the position of a suitable height above the center point may specifically refer to adding a constant value based on the center point to obtain the desired center of mass position. The constant value may be determined according to a height of the legged robot. Alternatively, the desired center of mass position may be preset. For example, the target landing point specifically includes four target landing points, center points of the four target landing points may be determined, and then the height of the legged robot 110 may be added based on the center points, thereby obtaining the desired center of mass position.

The first center of mass position may be determined according to the center of mass position change parameter, and a specific calculation formula may refer to the above formula (4) and formula (13).

A3-2: A quadratic term of a difference between a first center of mass velocity and a desired center of mass velocity at the end moment in the preset period.

In a possible embodiment, the desired center of mass velocity is determined according to the landing point in the candidate result, to be specific, after the desired center of mass position is determined, the desired center of mass velocity is obtained by dividing a difference between the desired center of mass position and an initial center of mass position by time.

For example, the first center of mass velocity is obtained according to a first derivative correlation of formula (13).

A3-3: A quadratic term of a difference between a first center of mass acceleration and a desired center of mass acceleration at the end moment in the preset period.

In a possible embodiment, the desired center of mass acceleration is determined according to the landing point in the candidate result, to be specific, after the desired center of mass velocity is determined, the desired center of mass acceleration is obtained by dividing a difference between the desired center of mass velocity and an initial center of mass velocity by time. For example, the first center of mass acceleration is obtained according to formula (14).

The following is an analysis of a role of each of the above quadratic terms:

Role of A1: The quadratic term related to the foot end contact force may be used for optimizing the distribution of an acting force between the foot end and the contact surface, so that the distribution of the acting force between the foot end and the contact surface is more uniform during a walking process of the legged robot 110.

Role of A2: The center of mass position change amount reflects a length of the center of mass motion trajectory, which is conducive to reducing an oscillation amplitude of the center of mass motion trajectory.

Role of A3-1 to A3-3: It is conducive to reducing errors between a calculated result and a desired result.

Combining the above A1 to A3, an expression of a cost function is as follows:

$$J_{grf}+J_{len}+J_{tgt}, \tag{31}$$

where $J_{grf}$ is a weighted sum of squares of all foot end contact forces in the preset period, $J_{len}$ is a weighted sum of squares of a difference between center of mass position change amounts at every two adjacent moments, and $J_{tgt}$ is a weighted sum of squares of a difference between the first center of mass position and the desired center of mass position at the end moment in the preset period, a difference between the first center of mass velocity and the desired center of mass velocity at the end moment in the preset period, and a difference between the first center of mass acceleration and the desired center of mass acceleration at the end moment in the preset period.

Figure 5:
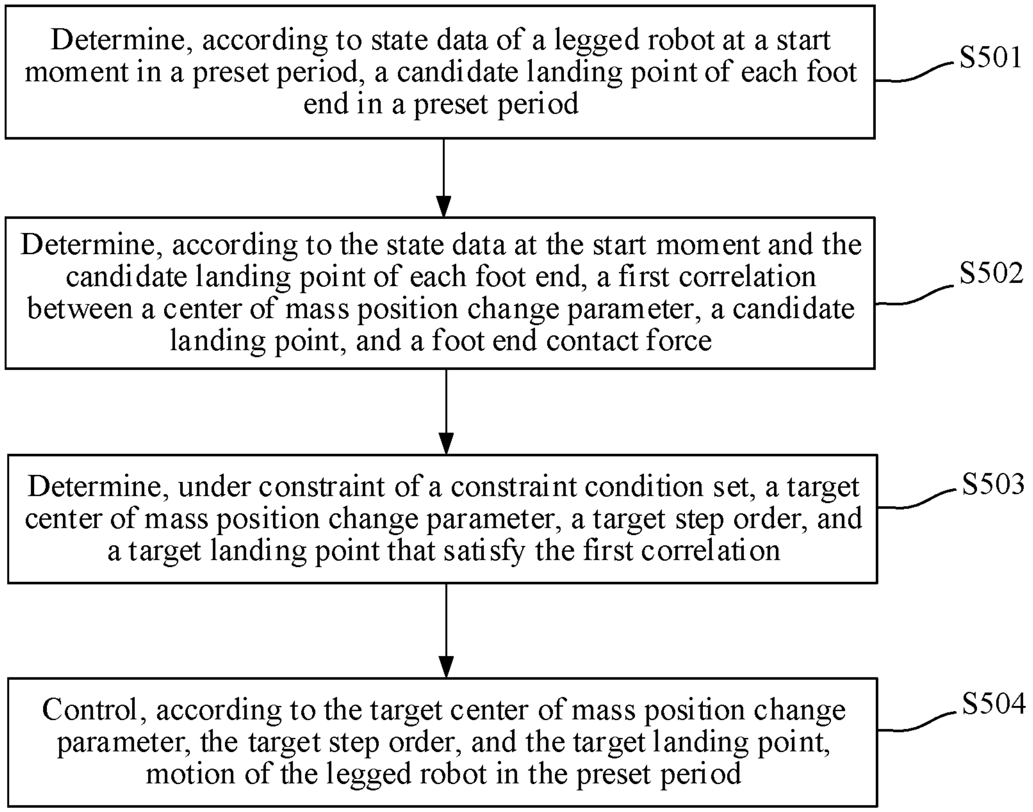
FIG. 5 is a flowchart of a method for controlling motion of a legged robot according to an embodiment of this disclosure.

After introducing the construction of the first correlation, the constraint condition set, and the cost function, the following exemplarily describes how to use the constructed first correlation and constraint condition set to control the motion process of the legged robot in this embodiment of this disclosure in combination with the flow of the method for controlling motion of a legged robot shown in FIG. 5. With reference to FIG. 5, the method is performed by an electronic device, such as the control device 120 in FIG. 1, and the method includes:

S501: Determine, according to state data of a legged robot at a start moment in a preset period, a candidate landing point of each foot end in a preset period. For example, one or more candidate landing points for each foot of plural feet of the robot on a contact surface in the preset period are determined according to positional state data of the legged robot at a start time point in the preset period.

In controlling the motion of the legged robot 110, the control device 120 controls the lifting and lowering of the foot end of the legged robot 110, thereby implementing the movement of the legged robot 110, so that the legged robot 110 can complete the motion from the start moment to the end moment in the entire preset period. The start moment is a position where the legged robot 110 is located at the current moment. The end moment is a position to be reached by the legged robot 110, which may be set in advance or determined by the control device 120 according to a task to be performed by the legged robot 110.

The meaning of the state data and a method for obtaining the state data may refer to the content discussed above, and details are not described herein again. The state data at the start moment may include a center of mass position at the start moment. The state data at the start moment may further include a center of mass velocity and a center of mass acceleration at the start moment, and in addition, the state data may further include a given pose of the legged robot 110 at the start moment. The given pose, the center of mass position, the center of mass velocity, or the center of mass acceleration may all be represented by coordinates in a coordinate system or by vectors, or the like.

As an embodiment, the preset period, the start moment, and the end moment are related to a sampling period of the selected legged robot 110, and the preset period, the start moment, and the end moment may be flexibly set according to needs. For example, the control device 120 may determine the current moment of the legged robot 110 as the start moment, the control device 120 may determine a moment corresponding to the $3^{rd}$s as the end moment, and the $3^{rd}$s may be selected as a start moment of the motion of the legged robot 110 in a next sampling period.

As an embodiment, candidate landing points of each foot end within a preset period may be determined according to state data at a start moment.

During the process from the start moment to the end moment of the legged robot 110, there may be one or more foot ends to land, and each foot end may land one or more times, which is specifically related to the set start moment and end moment. The control device 120 may pre-determine a plurality of candidate landing points for the foot end that needs to land each time. The candidate landing point refers to a possible landing point of the legged robot 110 in the preset period. The landing point may be represented by coordinates in a world coordinate system or by vectors, or the like.

In a specific implementation, the control device 120 may collect an environment image of the legged robot 110 through the visual sensing unit 210, and construct a conversion relationship between each pixel in the environment image and the world coordinate system. The control device 120 determines a possible candidate landing point along a moving direction from the start moment to the end moment through the environment image and the conversion relationship.

Specifically, the control device 120 may identify an obstacle that occurs from the start moment to the end moment according to the environment image, determine a position of a non-obstacle along the moving direction from the start moment to the end moment according to the conversion relationship, and use the determined position as a candidate landing point.

Alternatively, the control device 120 collects a three-dimensional point cloud map of the environment through the visual sensing unit 210, for example, the three-dimensional point cloud map may be obtained by collection in a case that the visual sensing unit 210 is an RGBD camera, or the three-dimensional point cloud map may be obtained by, for example, collecting a plurality of images of the environment in which the legged robot 110 is currently located, and reconstructing the plurality of environment images three-dimensionally. According to the three-dimensional point cloud map of the environment, a candidate plane in which the legged robot 110 may land is determined from the three-dimensional point cloud map, and specifically, a plane capable of supporting the legged robot may be determined as the candidate plane from the three-dimensional point cloud map. The control device 120 determines a candidate landing point corresponding to the foot end of the legged robot from the candidate plane.

Since the legged robot 110 may land more than once in the preset period, the control device 120 may determine all possible candidate landing points of the robot in the preset period, and all possible candidate landing points are the corresponding candidate landing points for each landing. Alternatively, in determining the candidate landing point, a possible landing region of the legged robot 110 for each landing may be determined according to a motion velocity of the legged robot 110, and the candidate landing point may be selected sequentially from the possible landing region for each landing according to any of the foregoing methods.

For example, further referring to FIG. 4A, the current position of the legged robot 110 is shown in FIG. 4A, and the control device 120 respectively determines candidate landing points 430 of the foot end, which include a plurality of circles on the ground shown in FIG. 4A.

Assuming that the legged robot 110 takes four steps in a preset period, one step for each leg, the candidate landing points of each leg are specifically shown in Table 1 below:

TABLE 1

| Leg | Left front leg | Right front leg | Left hind leg | Right hind leg |
|---|---|---|---|---|
| Candidate landing point mark | 1, 2, 3 | 4, 5 | 7, 8, 9 | 10, 11, 12 |

Table 1 shows that candidate landing points corresponding to a left front leg in a preset period are 1, 2, and 3 respectively; candidate landing points corresponding to a right front leg are 4 and 5; candidate landing points corresponding to a left hind leg are 7, 8, and 9; and candidate landing points corresponding to a right hind leg are 10, 11, and 12.

S502: Determine, according to the state data at the start moment and the candidate landing point of each foot end, a first correlation between a center of mass position change parameter, a candidate landing point, and a foot end contact force. For example, a first correlation between a center of mass position change parameter, candidate landing points, and foot contact force is determined according to the positional state data at the start time point and the one or more candidate landing points of each foot.

The first correlation is, for example, formula (20) discussed above, and the meaning of the change parameter may refer to the content discussed above. Details are not described herein again.

Referring to the first correlation shown in the above formula (20), the first correlation is not only related to the center of mass position change parameter, the landing point, and the foot end contact force, but also includes parameters such as $H_u$ and $w_u$. Therefore, values of these parameters may be determined by knowns such as the state data, thereby obtaining a first correlation including only three unknowns of the center of mass position change parameter, the landing point, and the foot end contact force.

The following is a specific example of how the control device 120 obtains the first correlation including only three unknowns of the center of mass position change parameter, the landing point, and the foot end contact force:

In a first possible manner, the control device 120 calculates a parameter such as $H_u$ corresponding to the start moment in formula (20) according to the state data at the start moment, thereby obtaining a first correlation corresponding to the start moment.

Specifically, a value of $\dot{L}$ in a $w_u$ calculation formula involved in formula (20) may be 0, and a value of w is calculated according to formula (12) according to the center of mass position at the start moment. In this case, the value of w at each sampling moment is the same, and thus a value of $w_u$ at each sampling moment is the same.

Alternatively, in another case, the control device 120 may calculate $\dot{L}$ according to the given pose at the start moment and the given pose at the end moment in combination with formulas (7) to (10), thereby calculating the value of $w_u$ corresponding to the start moment. The control device 120 may calculate a value of $H_u$ according to a calculation formula of $H_u$ and the center of mass position at the start moment.

The control device 120 substitutes the calculated value of $H_u$ at the start moment and the calculated value of $w_u$ at the start moment into formula (20), thereby obtaining the first correlation corresponding to the start moment.

In this manner, a target center of mass position change coefficient, a target foot end contact force, a target step order, and a target landing point are determined according to the first correlation corresponding to the start moment, the correlations involved are less, and the calculation amount is small.

In a second possible manner, a plurality of sampling moments are obtained from a preset period, a time interval corresponding to each sampling moment is determined, that is, a time interval between each sampling moment and the start moment is determined, and then the first correlation corresponding to each sampling moment is determined.

In a process of controlling the motion of the legged robot 110, it is necessary to obtain a center of mass position of the legged robot 110 at an arbitrary moment from the start moment to the end moment, but such a calculation amount is relatively large. For this reason, in this embodiment of this disclosure, the control device 120 may obtain the center of mass position at each sampling moment in the plurality of moments in the sampling period, and then determine a center of mass motion trajectory of the legged robot 110 based on the center of mass positions at the plurality of moments. The following describes the method for obtaining the first correlation corresponding to each sampling moment:

S1.1: Obtain a plurality of sampling moments.

Specifically, the plurality of sampling moments are determined from the preset period, and a time interval between each sampling moment and the start moment is determined.

The control device 120 may predict a preset period required by the legged robot according to a total length of the preset period and a motion velocity of the legged robot 110, or the control device 120 is pre-configured with the preset period required by the legged robot 110. The preset period is a duration corresponding to the sampling period. The control device 120 may determine a plurality of sampling moments from the sampling period.

After obtaining the preset period, the control device 120 may randomly sample from the preset period to obtain a plurality of sampling moments. The method for obtaining the sampling moment by randomly sampling is simpler.

Alternatively, the control device 120 obtains a plurality of sampling moments by sampling from a duration of each motion stage according to a step time of the legged robot 110. Since there is the corresponding sampling moment at each motion stage, it can be ensured that there is a corresponding sampling moment at each motion stage, which is conducive to improving the accuracy of a center of mass motion trajectory determined later.

As an embodiment, time intervals between every two adjacent sampling moments may be the same or different. Being different refers to that the time intervals between every two adjacent sampling moments are not completely the same, or there is a different time interval between two adjacent sampling moments.

As an embodiment, the greater a quantity of sampling moments, the more reasonable the distribution of sampling moments, and the higher the reliability of the determined center of mass motion trajectory. However, the more sampling moments, the greater a quantity of subsequent correlations constructed to solve the target center of mass position change parameter, the target landing point, and the target order, and the longer the time required for solving the target center of mass position change parameter, the target landing point, and the target order, so it is extremely important to properly program a quantity of sampling points. In an embodiment of this disclosure, the sampling moment includes at least a stage start moment and a stage end moment for each motion stage, and at least an intermediate moment in each motion stage. The intermediate moment refers to an arbitrary moment between the stage start moment and the stage end moment of the motion stage, for example, an intermediate moment between a start moment of the motion stage and an end moment of the motion stage may be selected.

For example, a quadrupedal walking gait of the legged robot 110 is set as a sampling period, and the control device 120 sequentially divides a motion process of the legged robot 110 in the sampling period into eight motion stages, which are specifically: quadrupedal support for center of mass movement, first stepping, second stepping, quadrupedal support for center of mass movement, quadrupedal support for center of mass movement, third stepping, fourth stepping, and quadrupedal support for center of mass movement.

Figures 6A, 6B:
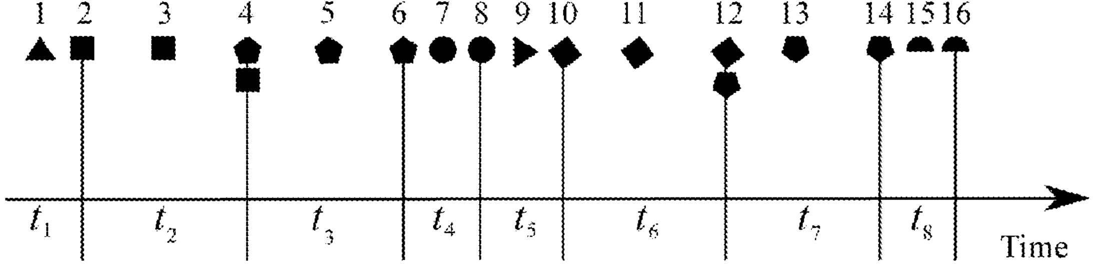
FIG. 6A is a schematic distribution diagram of sampling moments according to an embodiment of this disclosure.
FIG. 6B is an exemplary diagram of motion of a legged robot according to an embodiment of this disclosure.

Referring to a schematic distribution diagram of sampling moments shown in FIG. 6A, durations of the eight motion stages are respectively $t_1$, $t_2$, $t_3$, $t_4$, $t_5$, $t_6$, $t_7$, and ts shown in FIG. 6A. For ease of description, the eight motion stages are referred to as a first motion stage, a second motion stage, and so on. The control device 120 obtains a plurality of sampling moments by sampling from each motion stage, i.e., sampling moments 1 and 2 in the first motion stage, sampling moments 2, 3, and 4 in the second motion stage, sampling moments 4, 5, and 6 in the third motion stage, sampling moments 6, 7, and 8 in the fourth motion stage, and so on, as shown in FIG. 6A. In FIG. 6A, sampling moments represented by the same shape represent that the sampling moments belong to the same motion stage, and sampling moments represented by different shapes represent that the two sampling moments belong to two different motion stages.

Since each motion stage in a sampling period is continuous, an end moment of a specific motion stage may be regarded as both a sampling moment in the motion stage and a sampling moment in a next motion stage. For example, the sampling moment 4 shown in FIG. 6A above may be regarded as a sampling moment in both the second motion stage and the third motion stage.

S1.2: Obtain, for each sampling moment, a first correlation between a center of mass position change parameter, a foot end contact force, and a landing point at the sampling moment according to a center of mass position at a start moment, a time interval between each sampling moment and the start moment, and a second correlation.

The second correlation represents a change relationship between the foot end contact force of the legged robot at each sampling moment, a center of mass position at each sampling point, and the candidate landing points. The center of mass position may represent a sum of the start center of mass position and the center of mass position change amount. The second correlation may specifically refer to the above formula (5).

The control device 120 determines each time interval between the start moment and each sampling moment, so that the first correlation between the center of mass position change parameter, the landing point, and the foot end contact force can be obtained in combination with the second correlation.

In an embodiment, according to a given pose at a start moment and a given pose at an end moment in a preset period, a given pose of a legged robot for each sampling moment, and a pose change angle parameter of the legged robot for each sampling moment are obtained; for each sampling moment, a first derivative of a center of mass angular momentum relative to time at the sampling moment is determined according to the given pose at the sampling moment and the pose change angle parameter at the sampling moment; and according to the first derivative and the second correlation, the first correlation corresponding to the sampling moment is obtained.

Specifically, the control device 120 may calculate values of $H_u$ and $w_u$ in the above formula (20) corresponding to each sampling moment, and substitute an initial landing point $r_{is}$ and a candidate landing point $r_{ij}$, so as to obtain the first correlation of three unknowns of the center of mass position change parameter, the foot end contact force, and the landing point. The content of the calculation of the value of $H_u$ may refer to the content discussed above, and details are not described herein again.

The value of $w_u$ may be fixed, or the control device 120 determines a corresponding pose change angle of the legged robot at each sampling moment, and determines, according to the pose change angle at each sampling moment and the given pose corresponding to the start moment, a first derivative of a center of mass angular momentum at each sampling moment relative to time, that is, a value of $\dot{L}$, thereby calculating the value of $w_u$ corresponding to each sampling moment.

Further, since the control device 120 obtains a step time of the legged robot 110 and then obtains a foot end that needs to land in each motion stage, a value of $N_i$ corresponding to each sampling moment in formula (20) may be obtained.

After determining the value of $w_u$, the value of $H_u$, and the value of $N_i$ at each sampling moment, the obtained values corresponding to each sampling moment are substituted into the above formula (20), so as to obtain the first correlation between the center of mass position change parameter, the foot end contact force at each sampling moment, and the landing point. If there are a plurality of sampling moments, each sampling moment corresponds to a first correlation.

Further referring to the example shown in FIG. 6A, values of variables involved in each motion stage are analyzed below:

(1) In a first start stage, contact positions of four foot ends of a legged robot 110 with a contact surface have been determined, so a value of $N_i$ can be determined, and a value of $r_{ik}$ corresponds to a start landing point.

(2) In a case that the legged robot 110 is at a sampling point in a first stepping stage, the legged robot 110 has stepped once, but it is uncertain which leg has been taken, and a value of $r_{ik}$ of an i-th leg may be specifically represented as $r_{ij}$.

S503: Determine, under constraint of a constraint condition set, a target center of mass position change parameter, a target step order, and a target landing point that satisfy the first correlation. For example, a target center of mass position change parameter, a target step order, and a target landing point for each foot selected among the one or more candidate landing points for the respective foot are determined under a constraint condition set constraining a step order.

The constraint condition set at least includes a constraint condition used for constraining a step order, and the constraint condition used for constraining the step order specifically include a first constraint condition, a second constraint condition, and a third constraint condition. The first constraint condition is specifically shown as the foregoing formula (16), the second constraint condition is specifically shown as the foregoing formula (17), and the third constraint condition is specifically shown as the foregoing formula (18). In addition, the constraint condition set further includes one or more of a spatial landing constraint condition, a friction force constraint condition, and a foot end contact force constraint condition.

For example, in a case that the legged robot 110 only takes one step in a preset period, a corresponding constraint condition used for constraining a step order for the legged robot 110 may only include the first constraint condition or the third constraint condition.

Since a unique solution cannot be obtained according to the first correlation at each sampling moment and the constraint condition set, the control device 120 may determine a plurality of sets of candidate results that satisfy the first correlation at each sampling moment and the constraint condition set. Each set of candidate results includes the center of mass position change parameter, the target landing point, and the step order. If the step order and the target landing point are represented by $\beta_{ijk}$, then a value of $\beta_{ijk}$ is obtained in the candidate results, and the step order and the target landing point corresponding to each step can be further obtained according to the value of $\beta_{ijk}$.

There may be one or more target landing points in a set of candidate results, which is specifically related to landing times of the legged robot in the preset period. Certainly, each set of candidate results may further include a foot end contact force $f_{iju}$ corresponding to each sampling moment.

Further referring to the example shown in Table 1 above, the determined values in a set of candidate results are shown in Table 2 below:

TABLE 2

| Leg | Left front leg | Right front leg | Left hind leg | Right hind leg |
|---|---|---|---|---|
| Candidate landing point mark | 1, 2, 3 | 4, 5 | 7, 8, 9 | 10, 11, 12 |
| A value of $\beta_{ijk}$ in a case that k = 0 | 0, 0, 0 | 0, 0 | 0, 0, 0 | 0, 0, 0 |
| A value of $\beta_{ijk}$ in a case that k = 1 | 0, 0, 0 | 0, 1 | 0, 0, 0 | 0, 0, 0 |
| A value of $\beta_{ijk}$ in a case that k = 2 | 0, 0, 0 | 0, 1 | 0, 1, 0 | 0, 0, 0 |
| A value of $\beta_{ijk}$ in a case that k = 3 | 1, 0, 0 | 0, 1 | 0, 1, 0 | 0, 0, 0 |
| A value of $\beta_{ijk}$ in a case that k = 4 | 1, 0, 0 | 0, 1 | 0, 1, 0 | 0, 0, 1 |

From the above Table 2, it can be seen that in when not taking a step (k=0), each foot end of the legged robot 110 is located at the initial landing point, and when taking a first step (k=1), the legged robot 110 moves a right front leg, and the corresponding landing point is the candidate landing point represented by 5; when taking a second step (k=2), the legged robot moves a left hind leg, and the corresponding landing point is the candidate landing point represented by 8; when taking a third step (k=3), the legged robot moves a left front leg, and the corresponding landing point is the candidate landing point represented by 1; and when taking a fourth step (k=4), the legged robot moves a right hind leg, and the corresponding landing point is the candidate landing point represented by 12.

In order to describe the motion process of the legged robot 110 more clearly, referring to a schematic diagram of motion of a legged robot 110 shown in FIG. 6B, the right front leg of the legged robot 110 is currently at a landing point B, candidate landing points for a next step include 4 and 5, and the right front leg is to land on 5 next time. Similarly, the left hind leg of the legged robot 110 is currently at a landing point C, corresponding candidate landing points for a next step are 7, 8, and 9, a next landing point of the right hind leg is 8, and so on.

In a possible embodiment, the control device 120 may randomly select a set of candidate results from the plurality of sets of candidate results as a target result, that is, take a center of mass position change parameter in the set of candidate results as a target center of mass position change parameter, take a landing point in the candidate results as a target landing point, and determine a step order in the candidate results as a target step order.

In another possible embodiment, the control device 120 may determine, from the plurality of sets of candidate results, a candidate result corresponding to an optimized cost function, and take the candidate result corresponding to the optimized cost function as a target result.

Further, in a case that the constraint condition set further includes a spatial landing constraint condition, the spatial landing constraint condition is used for constraining a landing point of a foot end of the legged robot to be within a workspace of the foot end at each step, where a landing point of the foot end at each step is represented by a correlation between the step order, the candidate landing point of the foot end, and an initial landing point of the foot end. The process of determining the candidate result by the control device 120 is described as an example below:

Step 1: Obtain, for each sampling moment, a target constraint relationship between the center of mass position change parameter, the step order, and the candidate landing point according to the given pose of the legged robot 110 at each sampling moment and the spatial landing constraint condition.

An expression of the spatial landing constraint condition may refer to formula (26) discussed above. In formula (26), in addition to the center of mass position change parameter c, the candidate landing point, and the step order, some variables that need to be solved by the control device 120 may further be included, to be specific, such as $A_{iu}$, $B_{iu}$, $b_{iu}$, and $N_i$ in formula (30). The following exemplarily describes the method for determining these variables by the control device 120:

In a case that a joint length of the legged robot 110 and a rotation range of the joint are known, the control device 120 may calculate values of $S_i$ and $d_i$ corresponding to the legged robot. Alternatively, in a case that the joint length and the joint rotation range of the legged robot 110 are respectively the same as a joint length and a rotation range of a conventional legged robot, the control device 120 may directly obtain pre-stored values of $S_i$ and $d_i$.

Lengths of any two legs of the legged robot 110 are the same, and a rotation range of each leg of any two legs is the same, so the values of $S_i$ and $d_i$ corresponding to each leg of the legged robot 110 are the same. If a length of one leg of the legged robot 110 is different from a length of another leg, or a rotation range of one leg of the legged robot 110 is different from a rotation range of another leg, the control device 120 may respectively determine the values of $S_i$ and $d_i$ corresponding to each leg of the legged robot 110.

Further, the control device may calculate a corresponding given pose of the legged robot 110 at each sampling moment according to the given pose at the start moment and the given pose at the end moment, and then in combination with the above formula (7) to formula (10). That is, a value of $R_t$ of the legged robot 110 is obtained. Then, values of $A_{iu}$, $B_{iu}$, $b_{iu}$, and $N_i$ corresponding to each sampling moment may be calculated in combination with formula (22) and formula (23). The known $A_{iu}$, $B_{iu}$, $b_{iu}$, and $N_i$ at each sampling moment are substituted into formula (26), so as to obtain a target constraint relationship between the center of mass position change parameter, the step order, and the candidate landing point at each sampling moment.

In a possible case, if the pose of the legged robot 110 changes less, the value of $R_t$ may also be a fixed value.

As an embodiment, in a case that the constraint condition set further includes a friction force constraint condition, the meaning of the friction force constraint condition may refer to the content discussed above, and details are not described herein again. The control device 120 may obtain a constraint relationship between the landing point and the foot end contact force at each sampling moment according to the candidate landing point corresponding to each sampling moment and the friction force constraint condition. The friction force constraint condition is specifically shown in the above formula (28).

Specifically, the control device 120 may determine the candidate landing point corresponding to each sampling moment, represent $N_{ij}$ and $N_{is}$ using the candidate landing point corresponding to the sampling moment, and obtain a fourth constraint relationship of the foot end contact force $f_{iju}$ corresponding to each sampling moment, and a fifth constraint relationship of the foot end contact force $f_{isu}$ of the initial landing point corresponding to each sampling moment.

As an embodiment, in a case that the constraint condition set further includes a contact force constraint condition, the meaning of the contact force constraint condition may refer to the content discussed above, and details are not described herein again. The control device 120 may represent the candidate landing point as $n_{ij}$, and introduce a known upper limit of the contact force into the contact force constraint condition described above, that is, formula (30), so as to obtain a sixth constraint relationship between each sampling moment $\beta_{ijk}$ and the foot end contact force $f_{iju}$, and a seventh constraint relationship between each sampling moment and the foot end contact force $f_{isu}$.

Step 2: Determine a plurality of sets of candidate results that satisfy a first correlation at each sampling moment and a target constraint relationship at each sampling moment.

The control device 120 may determine each set of candidate results satisfying these relationships according to the first correlation at each sampling moment and the target constraint relationship at each sampling moment. The meaning of the candidate results may refer to the above contents, and details are not described herein again.

In a case that the constraint condition set further includes a friction force constraint condition and/or a contact force constraint condition, a plurality of sets of candidate results that satisfy the first correlation at each sampling moment, the target constraint relationship at each sampling time, the fourth constraint relationship at each sampling moment, the fifth constraint relationship, the sixth constraint relationship, and the seventh constraint relationship are determined.

For example, each set of candidate results is to specifically satisfy each of the following correlations:

$$\begin{cases} \sum_{i=1}^{h} G_{is} f_{isu} + \sum_{i=1}^{h} \sum_{j=1}^{N_i} G_{ij} f_{iju} \approx H_u c - w_u \\ A_{iu} c + B_{iu}\left(\sum_{j=1}^{N_i} \beta_{ijk} r_{ij} + \left(1 - \sum_{j=1}^{N_i} \beta_{ijk}\right) r_{is}\right) \le b_{iu} \\ N_{is}^T f_{isu} \le 0 \\ N_{ij}^T f_{iju} \le 0 \\ n_{is}^T f_{isu} \le f_{is}^u (1 - \beta_{ijk}) \\ n_{ij}^T f_{iju} \le f_{ij}^u \beta_{ijk} \\ \beta_{ijk} \in \{0, 1\},\ \sum_{i=1}^{N_i} \beta_{ijk} \in \{0, 1\} \\ \sum_{j=1}^{N_i} \beta_{ijk} \le \sum_{j=1}^{N_i} \beta_{ij(k+1)} \\ \sum_{i=1}^{h} \sum_{j=1}^{N_i} \beta_{ijk} = K \\ i = 1, 2, \ldots\ h \\ j = 1, 2, \ldots\ Ni \\ k = 1, 2, \ldots\ K \\ u = 1, 2, \ldots\ U \\ T(0) = 0,\ \dot{T}(0) c = v_0,\ \ddot{T}(0) c = a_0 \end{cases}, \tag{32}$$

where k represents any selected sampling moment, and the meanings of other letters in the above formula may refer to the content discussed above, and details are not described herein again. T(0) represents the center of mass change amount corresponding to the start moment, $v_0$ represents the center of mass velocity corresponding to the start moment, and $a_0$ represents the center of mass acceleration corresponding to the start moment.

Since the above involved correlations are still less than a quantity of unknowns to be solved, there are a plurality of sets of candidate results satisfying the above correlation, and after obtaining the plurality of sets of candidate results, the control device 120 may arbitrarily select one set as the target result; or minimize the cost function to obtain the target result.

In an embodiment, a plurality of sets of candidate results that satisfy a first correlation and a constraint condition set are obtained; each set of candidate results includes a center of mass position change parameter, a step order, and a landing point; a cost function is minimized according to the plurality of sets of candidate results to determine a target result from the plurality of sets of candidate results; and the cost function is a quadratic term constructed according to a correlation amount included in the candidate results, and the target result includes a target center of mass position change parameter, a step order, and a target landing point.

In an embodiment, for each set of candidate results in the plurality of sets of candidate results, a sum of squares of the foot end contact force in the preset period, a sum of squares of the center of mass position change amount in the preset period, and a sum of squares of a difference between first center of mass state data at the end moment of the preset period and desired center of mass state data are summed up to obtain a value of the cost function corresponding to the each set of candidate results; the desired center of mass state data is determined according to the landing point in the candidate results, and the first center of mass state data is determined according to the step order and the center of mass position change parameter in the candidate results; and a set of candidate results having the cost function with a smallest value is determined as the target result.

Specifically, after obtaining the plurality of sets of candidate results, the control device 120 may determine a value of the cost function corresponding to each set of candidate results, and determine a candidate result corresponding to the cost function having a smallest value as the target result. Taking the cost function being formula (31) discussed above as an example, the following introduces the obtaining of the value of the cost function corresponding to a set of candidate results by the control device 120:

(1) The control device 120 determines a weighted sum of squares of each foot end contact force according to the foot end contact force corresponding to each sampling moment in a set of candidate results, thereby obtaining a value of $J_{grf}$ in the cost function shown in formula (31). The weighted weights corresponding to any two foot end contact forces may be the same or may be different.

(2) The control device 120 determines a weighted sum of squares of a difference between the center of mass position change amounts at every two adjacent sampling moments in the plurality of sampling moments, thereby obtaining a value of $J_{len}$ in the cost function shown in formula (31). The weighted weights of any two center of mass position change amounts may be the same or may be different.

(3) The control device 120 determines a weighted sum of squares of a difference between the first center of mass position and the desired center of mass position at the end moment in the preset period, a difference between the first center of mass velocity and the desired center of mass velocity at the end moment in the preset period, and a difference between the first center of mass acceleration and the desired center of mass acceleration at the end moment in the preset period, thereby obtaining a value of $J_{tgt}$ in the cost function shown in formula (31).

After obtaining the value of $J_{grf}$, the value of $J_{len}$, and the value of $J_{tgt}$ in the cost function shown in formula (31), the control device 120 determines a sum of the value of $J_{grf}$, the value of $J_{len}$, and the value of $J_{tgt}$, thereby obtaining a value of the cost function corresponding to the candidate result.

By analogy, the value of the cost function corresponding to each set of candidate results of the control device 120 may be obtained, thereby determining a candidate result corresponding to the cost function having the smallest value as the target result.

S504: Control, according to the target center of mass position change parameter, the target step order, and the target landing point, motion of the legged robot in the preset period. For example, motion of the legged robot in the preset period is controlled accord to the target center of mass position change parameter, the target step order, and the target landing point for each foot.

The control device 120 may control the corresponding joint of the legged robot 110 to implement the lifting and lowering of each foot of the legged robot, thereby driving the legged robot 110 to move along a moving path. Specifically, the control device 120 controls target motion control parameters such as a joint torque of the corresponding joint of the legged robot 110 to cause at least one foot of the legged robot to support the movement of the legged robot, and to cause a true center of mass position of the legged robot to be as far as possible maintained at the center of mass position determined above. Therefore, in a case that the control device 120 obtains the target center of mass position change parameter, the target step order, and the target landing point, the control device 120 may first determine the target motion control parameters, and then control the motion of the legged robot 110 according to the target motion control parameters.

The process of determining the target motion control parameters by the control device 120 is described below:

After obtaining the target result, the control device 120 obtains the target center of mass position change parameter, the target step order, and the target landing point. Therefore, the control device 120 may obtain the center of mass position corresponding to any moment according to the start center of mass position, the center of mass position change parameter, and the target step order. The specific calculation formula involved may refer to the above formula (4) and formula (13). For example, after the control device 120 obtains the center of mass position change parameter c, the center of mass position at each moment can be calculated; and after obtaining the value of $\beta_{ijk}$, the control device 120 can obtain the leg of each step, that is, the step order, and the candidate landing point selected for each step, that is, the target landing point.

Figure 7:
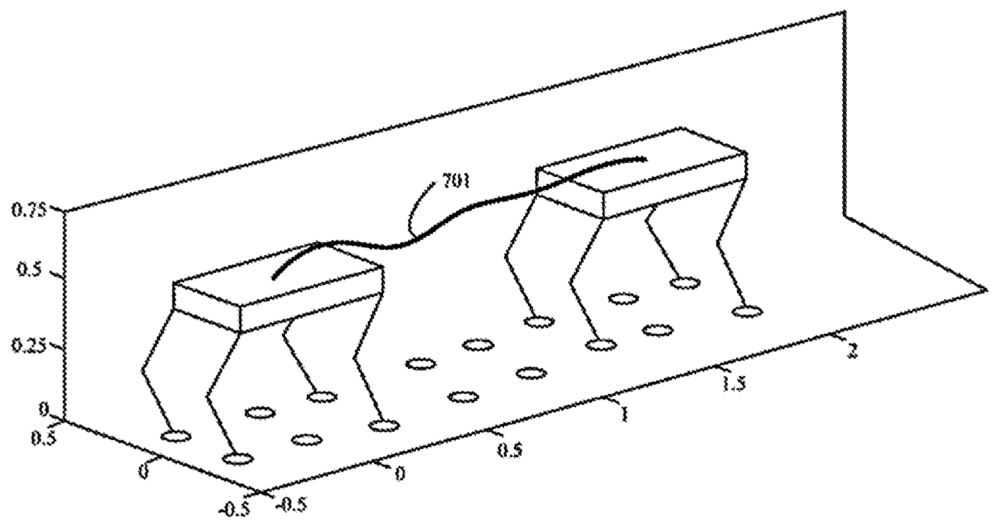
FIG. 7 is an exemplary diagram of a motion process of a legged robot according to an embodiment of this disclosure.

For example, referring to FIG. 7, which is an exemplary diagram of a motion process of a legged robot 110, the center of mass motion trajectory of the legged robot may be shown as 701 in FIG. 7. It can be seen from FIG. 7 that, the center of mass position of the legged robot 110 varies continuously over time with less fluctuation.

The control device 120 determines the center of mass position of the legged robot at each sampling moment according to the target center of mass position change parameter; and determines the desired foot end position of the legged robot at each sampling moment in the preset period according to the start landing point, the target step order, and the target landing point at the start moment.

Specifically, the control device 120 determines the corresponding foot of the legged robot 110 that needs to land at each motion stage according to the obtained target landing point at each sampling moment and the target step order, and performs interpolation on the start landing point and the target landing point, thereby obtaining the corresponding desired foot end position of the legged robot 110 at each sampling moment.

The control device 120 determines the desired pose of the legged robot at each sampling moment according to the given pose at the start moment and the desired pose of the legged robot 110 at the end moment. Specifically, a desired pose change angle corresponding to each sampling moment is calculated, so as to calculate the corresponding desired pose of the legged robot 110 at each sampling moment according to the desired pose change angle corresponding to each sampling moment. The specific calculation formula may refer to the above formula (7) to formula (10), where the desired pose at the end moment may be determined according to the landing point of the legged robot 110 at the end moment.

Further, the control device 120 performs an inverse kinematic operation on the center of mass position of the legged robot at each sampling moment, the desired pose at the sampling moment, and the desired foot end position at the sampling moment, to determine a desired joint rotation angle of the legged robot at the sampling moment. The desired joint rotation angle is differentiated to obtain a desired angular velocity corresponding to each sampling moment.

The control device 120 determines, for each sampling moment, a joint torque of the legged robot at each sampling moment according to the desired joint rotation angle at each sampling moment and a current joint rotation angle at the sampling moment.

Specifically, the control device 120 determines the joint torque of the legged robot at the corresponding moment through a robot dynamics control method according to the desired joint rotation angle at each sampling moment, the desired angular velocity, the current joint rotation angle at the sampling moment, and the angular velocity, to obtain the target motion control parameters.

During a control process, the control device 120 determines a desired foot end contact force according to the desired pose, the desired center of mass position, a determined pose, and a center of mass position, and obtains a feed-forward torque through multiplying the optimized foot end contact force by the transposition corresponding to a Jacobian matrix to convert the foot end contact force to a joint. Then, a feedback torque is calculated by using independent joint control according to the desired joint rotation angle and the joint angle of the joint. Finally, a sum of the feed-forward torque and the feedback torque is limited, and a final torque control signal for controlling the legged robot 110 is obtained.

As an embodiment, steps of S501 to S504 may be performed by the trajectory generation unit 220, or the visual sensing unit 210 is configured to collect the state data at the start moment in the preset period, the trajectory generation unit 220 executes the steps of S501 to S503, and a trajectory control unit 230 executes the step of S504.

In this embodiment of this disclosure, in the process of controlling the motion of the legged robot 110, the center of mass position change parameter, the step order, and the landing point are determined according to a motion process of the legged robot 110. That is, before the motion of the legged robot 110, the programmed motion control parameter of the legged robot 110 can be more in line with the motion process of the legged robot. Moreover, since it is unnecessary to set the center of mass position change parameter, the step order, the landing point, and the like of the legged robot 110, the intelligence degree of the motion of the legged robot 110 is improved.

Figure 8:
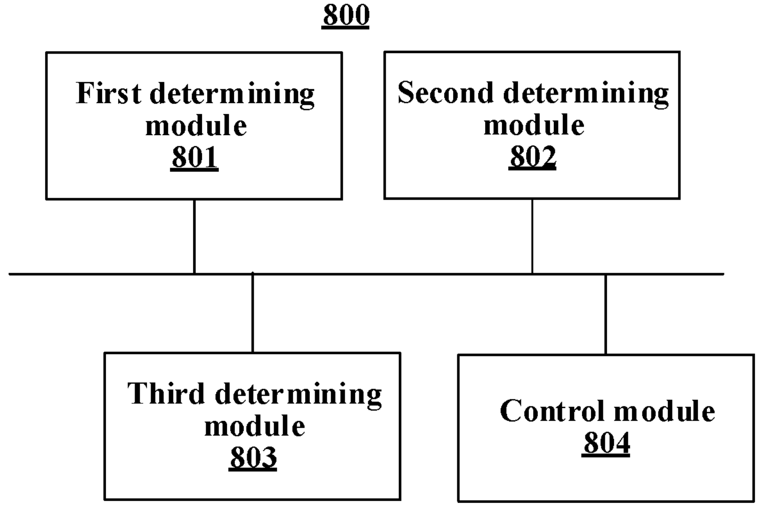
FIG. 8 is a schematic structural diagram of an apparatus for controlling motion of a legged robot according to an embodiment of this disclosure.

An embodiment of this disclosure provides an apparatus for controlling motion of a legged robot, which is equivalent to being arranged in the control device 120 discussed above. Referring to FIG. 8, the legged robot includes a plurality of foot ends, and the apparatus 800 for controlling motion of a legged robot includes:

- a first determining module 801, configured to determine, according to state data of the legged robot at a start moment in a preset period, a candidate landing point of each foot end in the preset period;
- a second determining module 802, configured to determine, according to the state data at the start moment and the candidate landing point of each foot end, a first correlation between a center of mass position change parameter, a candidate landing point, and a foot end contact force;
- a third determining module 803, configured to determine, under constraint of a constraint condition set, a target center of mass position change parameter, a target step order, and a target landing point that satisfy the first correlation, the constraint condition set including a constraint condition used for constraining a step order; and
- a control module 804, configured to control, according to the target center of mass position change parameter, the target step order, and the target landing point, motion of the legged robot in the preset period.

In a possible embodiment, the step order is related to the selected candidate landing point of the corresponding foot end, and the constraint condition used for constraining the step order includes at least one of the following:

- a first constraint condition that constrains the legged robot to select at most one candidate landing point per leg at each step;
- a second constraint condition that constrains the legged robot not to withdraw after each leg step; and
- a third constraint condition that constrains the legged robot to have a quantity of steps reaching a preset quantity of steps in the preset period, selection of one candidate landing point corresponding to one step.

In a possible embodiment, the second determining module 802 is specifically configured to:

- determine a plurality of sampling moments from the preset period, and determine a time interval between each sampling moment and the start moment; and
- obtain, for each sampling moment, the first correlation according to a center of mass position at the start moment, a time interval corresponding to the sampling moment, and a second correlation,
- the second correlation representing a change relationship between the foot end contact force of the legged robot at each sampling moment, a center of mass position at the each sampling moment, and the candidate landing point, the center of mass position at the sampling moment being set to be a sum of the center of mass position at the start moment and a center of mass position change amount in the time interval, and the center of mass position change amount being represented by the center of mass position change parameter and the time interval.

In a possible embodiment, the state data at the start moment further includes a given pose at the start moment, and the second determining module 802 is specifically configured to:

determine, according to the given pose at the start moment and a given pose at an end moment in the preset period, a given pose of the legged robot for each sampling moment, and a pose change angle parameter for each sampling moment; and determine, for each sampling moment, a first derivative of a center of mass angular momentum relative to time at the sampling moment according to the given pose and the pose change angle parameter at the sampling moment; and obtain, according to the first derivative and the second correlation, the first correlation corresponding to the sampling moment.

In a possible embodiment, the constraint condition set further includes a spatial landing constraint condition, the spatial landing constraint condition is used for constraining a landing point of a foot end of the legged robot to be within a workspace of the foot end at each step, where a landing point of the foot end at each step is represented by a correlation between the step order, the candidate landing point of the foot end, and an initial landing point of the foot end; and The third determining module 803 is specifically configured to:

determine, for each sampling moment, a target constraint relationship between the center of mass position change parameter, the step order, and the candidate landing point according to the spatial landing constraint condition and a given pose at each sampling moment; and determine the target center of mass position change parameter, the target step order, and the target landing point in response to satisfying the target constraint relationship and the first correlation.

In a possible embodiment, the constraint condition set further includes at least one of the following:

a friction force constraint condition, the friction force constraint condition being used for constraining the foot end contact force at each sampling moment to be located in a friction cone, the friction cone being determined according to a normal vector of the candidate landing point and a friction coefficient between the landing foot end and a contact surface; and a foot end contact force constraint condition, the foot end contact force constraint condition being used for constraining a component of a foot end contact force at each sampling moment in a normal direction to be less than or equal to an upper limit of a contact force.

In a possible embodiment, the third determining module 803 is specifically configured to:

obtain a plurality of sets of candidate results that satisfy the first correlation and the constraint condition set, each set of candidate results including a center of mass position change parameter, a step order, and a landing point; and minimize a cost function according to the plurality of sets of candidate results to determine a target result from the plurality of sets of candidate results, the cost function being a quadratic term constructed according to a correlation amount included in the candidate results, and the target result including the target center of mass position change parameter, the step order, and the target landing point.

In a possible embodiment, the third determining module 803 is specifically configured to:

sum up, for each set of candidate results in the plurality of sets of candidate results, a sum of squares of the foot end contact force in the preset period, a sum of squares of the center of mass position change amount in the preset period, and a sum of squares of a difference between first center of mass state data at the end moment of the preset period and desired center of mass state data, to obtain a value of the cost function corresponding to the each set of candidate results, the desired center of mass state data being determined according to the landing point in the candidate results, and the first center of mass state data being determined according to the step order and the center of mass position change parameter in the candidate results; and determine a set of candidate results having the cost function with a smallest value as the target result.

In a possible embodiment, the control module 804 is specifically configured to:

determine, according to the target center of mass position change parameter, a center of mass position of the legged robot at each sampling moment;

determine, according to an initial landing point, the target step order, and the target landing point at the start moment, a desired foot end position of the legged robot at each sampling moment in the preset period;

determine, according to a given pose at the start moment and a desired pose of the legged robot at an end moment, a desired pose of the legged robot at each sampling moment;

perform, for each sampling moment, an inverse kinematic operation on the center of mass position of the legged robot at the sampling moment, the desired pose at the sampling moment, and the desired foot end position at the moment, to determine a desired joint rotation angle of the legged robot at the sampling moment; determine, for each sampling moment, a joint torque at the sampling moment according to the desired joint rotation angle and a current joint rotation angle at the sampling moment; and control, according to a joint torque at each sampling moment, motion of the legged robot in the preset period.

The apparatus shown in FIG. 8 can implement any one of the methods for controlling motion of a legged robot, and details are not described herein again.

Figure 9:
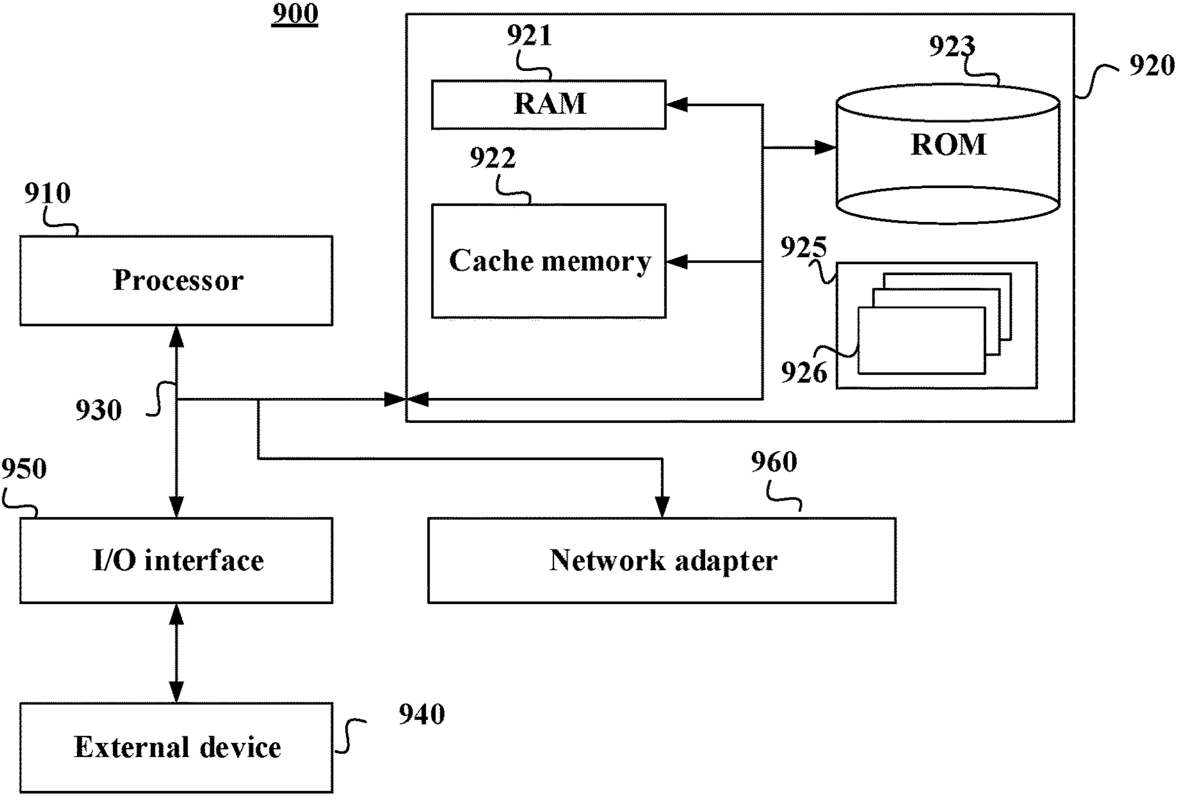
FIG. 9 is a schematic structural diagram of an electronic device according to an embodiment of this disclosure.

Referring to FIG. 9, an electronic device 900 is represented in the form of a general-purpose computer device. Components of the electronic device 900 may include, but are not limited to: at least one processor 910 (including processing circuitry), at least one memory 920 (including a non-transitory computer-readable storage medium), and a bus 930 connected to different system components (including the processor 910 and the memory 920).

The bus 930 represents one or more of several types of bus structures, including a memory bus or a memory controller, a peripheral bus, a processor, or a local bus using any bus structure among various bus structures.

The memory 920 may include a readable medium in the form of a volatile memory, such as a random access memory (RAM) 921 and/or a cache memory 922, and may further include a read-only memory (ROM) 923. The memory 920 may further include a program/utility 926 having a set of (at least one) program modules 925. Such program modules 925 include, but are not limited to: an operating system, one or more application programs, other program modules, and program data, and each or a combination of these examples may include implementation of a network environment. The processor 910 is configured to execute program instructions, etc., stored in the memory 920 to implement the method for controlling motion of a legged robot described above.

The electronic device 900 may communicate with one or more external devices 940 (such as a keyboard and a pointing device), and may also communicate with one or more devices that enable a terminal to interact with the electronic device 900, and/or communicate with any device (such as a router or a modem) that enables the electronic device 900 to communicate with one or more other devices. This communication may proceed through an input/output (I/O) interface 950. In addition, the electronic device 900 may further communicate with one or more networks (such as a local area network (LAN), a wide area network (WAN), and/or a public network (such as the Internet)) through a network adapter 960. As shown in the drawing, the network adapter 960 communicates with other modules of the electronic device 900 through the bus 930. It is to be understood that although not shown in the drawing, other hardware and/or software modules may be used in combination with the electronic device 900, including, but not limited to, microcode, a device driver, a redundancy processing unit, an external magnetic disk driving array, a RAID system, a magnetic tape drive, a data backup storage system, and the like.

An embodiment of this disclosure provides a storage medium, storing computer instructions, the computer instructions, when run on a computer, causing the computer to perform the method for controlling motion of a legged robot described above.

An embodiment of this disclosure provides a computer program product, including computer instructions, the computer instructions being stored in a computer-readable storage medium. A processor of a computer device reads the computer instructions from the computer-readable storage medium, and executes the computer instructions, to cause the computer device to perform the method for controlling motion of a legged robot described above.

A person skilled in the art is to understand that the embodiments of this disclosure may be provided as a method, a system, or a computer program product. Therefore, this disclosure may use a form of hardware-only embodiments, software-only embodiments, or embodiments combining software and hardware. In addition, this disclosure may use a form of a computer program product that is implemented on one or more computer-usable storage media (including but not limited to a disk memory, a CD-ROM, an optical memory, and the like) that include computer-usable program code.

The foregoing disclosure includes some exemplary embodiments of this disclosure which are not intended to limit the scope of this disclosure. Other embodiments shall also fall within the scope of this disclosure.

What is claimed is:

1. A method for controlling motion of a legged robot, the method comprising:

determining, according to positional state data of the legged robot at a start time point in a preset period, a plurality of discrete candidate landing points for each foot of plural feet of the robot, each of the plurality of discrete candidate landing points corresponding to a respective landing position of the respective foot on a contact surface during the preset period;

determining, according to the positional state data at the start time point and the plurality of discrete candidate landing points for each foot, a first correlation between a center of mass position change parameter, the plurality of discrete candidate landing points, and foot contact force;

prior to initiating movement of the feet, determining, under a constraint condition set and based on the first correlation, (i) a target center of mass position change parameter, (ii) a target step order, and (iii) a target landing point for each foot selected from the plurality of discrete candidate landing points corresponding to the respective foot, the constraint condition set constraining the target step order and constraining selection to one candidate landing point per foot at each step in the target step order; and controlling, according to the target center of mass position change parameter, the target step order, and the selected target landing point for each foot, motion of the feet of the legged robot to land each foot at the target landing point of the respective foot on the contact surface during the preset period.

2. The method according to claim 1, wherein the determining the target center of mass position change parameter, the target step order, and the target landing point for each foot includes determining the target center of mass position change parameter, the target step order, and the target landing point for each foot under at least one of:

a second constraint condition that constrains the legged robot not to withdraw a foot after the robot has completed a step; or a third constraint condition that constrains the legged robot to take a preset quantity of steps in the preset period, selection of one target landing point corresponding to one step.

3. The method according to claim 1, wherein the determining the first correlation comprises:

determining a plurality of sampling time points from the preset period, and determining a time interval between each sampling time point and the start time point; and obtaining, for each sampling time point, the first correlation according to a center of mass position at the start time point, a time interval between the respective sampling time point and the start time point, and a second correlation, and the second correlation represents a change relationship between the foot contact forces of the legged robot at each sampling time point, a center of mass position at the each sampling time point, and the candidate landing points, where the center of mass position at each sampling time point is a sum of the center of mass position at the start time point and a center of mass position change amount in the time interval, and the center of mass position change amount is represented by the center of mass position change parameter and the time interval.

4. The method according to claim 3, wherein the positional state data at the start time point comprises a pose of the legged robot at the start time point, and the obtaining, for each sampling time point, the first correlation comprises:

determining, according to the pose of the legged robot at the start time point and a pose of the legged robot at an end time point in the preset period, a pose of the legged robot for the respective sampling time point, and a pose change angle parameter for the respective sampling time point;

determining, for the respective sampling time point, a first derivative of a center of mass angular momentum relative to time at the respective sampling time point according to the pose at the respective sampling time point and the pose change angle parameter at the respective sampling time point; and obtaining, according to the first derivative and the second correlation, the first correlation corresponding to the respective sampling time point.

5. The method according to claim 3, wherein the constraint condition set further comprises a spatial landing constraint condition constraining a landing point of a foot of the legged robot to be within a workspace of the respective foot at each step, the landing point of the respective foot at each step is represented by a correlation between the target step order, the target landing point of the foot, and an initial position of the foot; and the determining the target center of mass position change parameter, the target step order, and the target landing point for each foot comprises:

determining, for each sampling time point, a target constraint relationship between the center of mass position change parameter, the target step order, and the candidate landing points according to the spatial landing constraint condition and a pose at the respective sampling time point; and determining the target center of mass position change parameter, the target step order, and the target landing point by satisfying the target constraint relationship and based on the first correlation.

6. The method according to claim 5, wherein the determining the target center of mass position change parameter, the target step order, and the target landing point for each foot includes determining the target center of mass position change parameter, the target step order, and the target landing point for each foot under at least one of:

a friction force constraint condition, the friction force constraint condition constraining a foot contact force at each sampling time point to be located in a friction cone determined according to a normal vector of the target landing point and a friction coefficient between a landing foot and a contact surface; or a foot contact force constraint condition constraining a component of a foot contact force at each sampling time point in a normal direction to be less than or equal to an upper limit of a contact force.

7. The method according to claim 1, wherein the determining the target center of mass position change parameter, the target step order, and the target landing point for each foot comprises:

obtaining a plurality of sets of candidate results that satisfy the first correlation and the constraint condition set, each set of candidate results comprising a center of mass position change parameter, a step order, and a landing point; and minimizing a cost function according to the plurality of sets of candidate results to determine a target result from the plurality of sets of candidate results, the cost function being a quadratic term constructed according to the candidate results, and the target result comprising the target center of mass position change parameter, the target step order, and the target landing point.

8. The method according to claim 7, wherein the minimizing comprises:

summing up, for each set of candidate results in the plurality of sets of candidate results, a sum of squares of the foot contact force in the preset period, a sum of squares of the center of mass position change amount in the preset period, and a sum of squares of a difference between first center of mass state data at an end time point of the preset period and desired center of mass state data, to obtain a value of the cost function corresponding to each set of candidate results, the desired center of mass state data being determined according to the landing point in the candidate results, and the first center of mass state data being determined according to the step order and the center of mass position change parameter in the candidate results; and determining a set of candidate results having the cost function with a smallest value as the target result.

9. The method according to claim 1, wherein the controlling comprises:

determining, according to the target center of mass position change parameter, a center of mass position of the legged robot at each sampling time point;

determining, according to an initial landing point, the target step order, and the target landing point, a desired foot position of the legged robot at each sampling time point in the preset period;

determining, according to a pose of the legged robot at the start time point and a desired pose of the legged robot at an end time point, a desired pose of the legged robot at each sampling time point;

performing, for each sampling time point, an inverse kinematic operation on the center of mass position of the legged robot at the respective sampling time point, the desired pose at the respective sampling time point, and the desired foot position at the respective sampling time point, to determine a desired joint rotation angle of the legged robot at the respective sampling time point;

determining, for each sampling time point, a joint torque at the respective sampling time point according to the desired joint rotation angle and a current joint rotation angle at the respective sampling time point; and controlling, according to the joint torque at each sampling time point, motion of the legged robot in the preset period.

10. An apparatus for controlling motion of a legged robot, and the apparatus comprising:

processing circuitry configured to determine, according to positional state data of the legged robot at a start time point in a preset period, a plurality of discrete candidate landing points for each foot of plural feet of the robot, each of the plurality of discrete candidate landing points corresponding to a respective landing position of the respective foot on a contact surface during the preset period;

determine, according to the positional state data at the start time point and the plurality of discrete candidate landing points for each foot, a first correlation between a center of mass position change parameter, the plurality of discrete candidate landing points, and foot contact force;

prior to initiating movement of the feet, determine, under a constraint condition set and based on the first correlation, (i) a target center of mass position change parameter, (ii) a target step order, and (iii) a target landing point for each foot selected from the plurality of discrete candidate landing points corresponding to the respective foot, the constraint condition set constraining the target step order and constraining selection to one candidate landing point per foot at each step in the target step order; and control, according to the target center of mass position change parameter, the target step order, and the selected target landing point for each foot, motion of the feet of the legged robot to land each foot at the target landing point of the respective foot on the contact surface during the preset period.

11. The apparatus according to claim 10, wherein the constraint condition set further comprises at least one of:

a second constraint condition that constrains the legged robot not to withdraw a foot after the robot has completed a step; and a third constraint condition that constrains the legged robot to take a preset quantity of steps in the preset period, selection of one target landing point corresponding to one step.

12. The apparatus according to claim 10, wherein the processing circuitry is further configured to:

determine a plurality of sampling time points from the preset period, and determine a time interval between each sampling time point and the start time point; and obtain, for each sampling time point, the first correlation according to a center of mass position at the start time point, a time interval between the respective sampling time point and the start time point, and a second correlation, wherein the second correlation represents a change relationship between the foot contact force of the legged robot at each sampling time point, a center of mass position at the each sampling time point, and the candidate landing points, where the center of mass position at the sampling time point is a sum of the center of mass position at the start time point and a center of mass position change amount in the time interval, and the center of mass position change amount is represented by the center of mass position change parameter and the time interval.

13. The apparatus according to claim 12, wherein the positional state data at the start time point comprises a pose at the start time point, and the processing circuitry is further configured to, for each sampling time point, determine, according to the pose at the start time point and a pose of the legged robot at an end time point in the preset period, a pose of the legged robot for the respective sampling time point, and a pose change angle parameter for the respective sampling time point;

determine, for the respective sampling time point, a first derivative of a center of mass angular momentum relative to time at the respective sampling time point according to the pose at the respective sampling time point and the pose change angle parameter at the respective sampling time point; and obtain, according to the first derivative and the second correlation, the first correlation corresponding to the respective sampling time point.

14. The apparatus according to claim 12, wherein the constraint condition set further comprises a spatial landing constraint condition constraining a landing point of a foot of the legged robot to be within a workspace of the respective foot at each step, the landing point of the respective foot at each step is represented by a correlation between the target step order, the target landing point of the foot, and an initial position of the foot; and the processing circuitry is further configured to determine, for each sampling time point, a target constraint relationship between the center of mass position change parameter, the target step order, and the candidate landing points according to the spatial landing constraint condition and a pose at the respective sampling time point; and determine the target center of mass position change parameter, the target step order, and the target landing point by satisfying the target constraint relationship and based on the first correlation.

15. The apparatus according to claim 14, wherein the constraint condition set further comprises at least one of:

a friction force constraint condition, the friction force constraint condition constraining the foot contact force at each sampling time point to be located in a friction cone determined according to a normal vector of the target landing point and a friction coefficient between a landing foot and a contact surface; or a foot contact force constraint condition constraining a component of a foot contact force at each sampling time point in a normal direction to be less than or equal to an upper limit of a contact force.

16. The apparatus according to claim 10, wherein the processing circuitry is further configured to:

obtain a plurality of sets of candidate results that satisfy the first correlation and the constraint condition set, each set of candidate results comprising a center of mass position change parameter, a step order, and a landing point for each foot; and minimize a cost function according to the plurality of sets of candidate results to determine a target result from the plurality of sets of candidate results, the cost function being a quadratic term constructed according to the candidate results, and the target result comprising the target center of mass position change parameter, the target step order, and the target landing point for each foot.

17. The apparatus according to claim 16, wherein the processing circuitry is further configured to:

sum up, for each set of candidate results in the plurality of sets of candidate results, a sum of squares of the foot contact force in the preset period, a sum of squares of the center of mass position change amount in the preset period, and a sum of squares of a difference between first center of mass state data at an end time point of the preset period and desired center of mass state data, to obtain a value of the cost function corresponding to the each set of candidate results, the desired center of mass state data being determined according to the landing point in the candidate results, and the first center of mass state data being determined according to the step order and the center of mass position change parameter in the candidate results; and determine a set of candidate results having the cost function with a smallest value as the target result.

18. The apparatus according to claim 10, wherein the processing circuitry is further configured to:

determine, according to the target center of mass position change parameter, a center of mass position of the legged robot at each sampling time point;

determine, according to an initial landing point, the target step order, and the target landing point at the start time point, a desired foot position of the legged robot at each sampling time point in the preset period;

determine, according to a pose of the legged robot at the start time point and a desired pose of the legged robot at an end time point, a desired pose of the legged robot at each sampling time point;

perform, for each sampling time point, an inverse kinematic operation on the center of mass position of the legged robot at the respective sampling time point, the desired pose at the respective sampling time point, and the desired foot position at the respective sampling time point, to determine a desired joint rotation angle of the legged robot at the respective sampling time point;

determine, for each sampling time point, a joint torque at the respective sampling time point according to the desired joint rotation angle and a current joint rotation angle at the respective sampling time point; and control, according to the joint torque at each sampling time point, motion of the legged robot in the preset period.

19. A non-transitory computer-readable storage medium storing computer-readable instructions thereon, which, when executed by a computer device, cause the computer device to perform a method for controlling motion of a legged robot, the method comprising:

determining, according to positional state data of the legged robot at a start time point in a preset period, a plurality of discrete candidate landing points for each foot of plural feet of the robot, each of the plurality of discrete candidate landing points corresponding to a respective landing position of the respective foot on a contact surface during the preset period;

determining, according to the positional state data at the start time point and the plurality of discrete candidate landing points for each foot, a first correlation between a center of mass position change parameter, the plurality of discrete candidate landing points, and foot contact force;

prior to initiating movement of the feet, determining, under a constraint condition set and based on the first correlation, (i) a target center of mass position change parameter, (ii) a target step order, and (iii) a target landing point for each foot selected from the plurality of discrete candidate landing points corresponding to the respective foot, the constraint condition set constraining the target step order and constraining selection to one candidate landing point per foot at each step in the target step order; and controlling, according to the target center of mass position change parameter, the target step order, and the selected target landing point for each foot, motion of the feet of the legged robot to land each foot at the target landing point of the respective foot on the contact surface during the preset period.

20. The non-transitory computer-readable storage medium according to claim 19, wherein the determining the target center of mass position change parameter, the target step order, and the target landing point for each foot includes determining the target center of mass position change parameter, the target step order, and the target landing point for each foot under at least one of:

a second constraint condition that constrains the legged robot not to withdraw a foot after the robot has completed a step; or a third constraint condition that constrains the legged robot to take a preset quantity of steps in the preset period, selection of one target landing point corresponding to one step.

* * * * *